US011200897B2

(12) United States Patent
Yi et al.

(10) Patent No.: US 11,200,897 B2
(45) Date of Patent: Dec. 14, 2021

(54) METHOD AND APPARATUS FOR SELECTING VOICE-ENABLED DEVICE

(71) Applicant: LG ELECTRONICS INC., Seoul (KR)

(72) Inventors: Donghoon Yi, Seoul (KR); Heewan Park, Seoul (KR); Byounggi Lee, Seoul (KR); Yuyong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 16/559,184

(22) Filed: Sep. 3, 2019

(65) Prior Publication Data

US 2019/0392834 A1 Dec. 26, 2019

(30) Foreign Application Priority Data

Jun. 25, 2019 (KR) .......................... 10-2019-0075770

(51) Int. Cl.
   *G10L 15/22* (2006.01)
   *G10L 15/30* (2013.01)
   *G10L 15/08* (2006.01)

(52) U.S. Cl.
   CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
   USPC ...................................................... 704/1–504
   See application file for complete search history.

(56) References Cited

U.S. PATENT DOCUMENTS

| 10,692,495 | B2 * | 6/2020 | Woo | .................. | G10L 15/08 |
| 10,832,670 | B2 * | 11/2020 | Park | .................. | G10L 15/083 |
| 2004/0128137 | A1 * | 7/2004 | Bush | .................. | G06F 3/167 |
| | | | | | 704/275 |

(Continued)

FOREIGN PATENT DOCUMENTS

| KR | 10-2018-0039135 A | 4/2018 |
| KR | 10-2018-0089901 A | 8/2018 |

(Continued)

*Primary Examiner* — Marcus T Riley
(74) *Attorney, Agent, or Firm* — Birch, Stewart, Kolasch & Birch, LLP

(57) ABSTRACT

A method and apparatus for selecting a voice-enabled device are disclosed. The voice-enabled device selecting apparatus may reduce the amount of communication load between a home IoT server and home IoT devices and minimize the amount of computation of the home IoT server by obtaining information related to the direction from which each voice recognition device receives a wakeup word from a plurality of voice recognition devices, determining the position where the wakeup word is spoken by using the information related to the direction from which the wakeup word is received, and selecting the voice recognition device closest to the speech position as a voice-enabled device. At least one of the voice enable device selecting apparatus, IoT device, and a server may be associated with an artificial intelligence (AI) module, an unmanned aerial vehicle (UAV) (or drone), a robot, an augmented reality (AR) device, a virtual reality (VR) device, and a device related to a 5G service.

19 Claims, 18 Drawing Sheets

(56) References Cited

U.S. PATENT DOCUMENTS

| | | | |
|---|---|---|---|
| 2009/0204409 A1* | 8/2009 | Mozer | G10L 15/32 |
| | | | 704/275 |
| 2013/0041665 A1* | 2/2013 | Jang | H04N 21/478 |
| | | | 704/246 |
| 2018/0211665 A1* | 7/2018 | Park | G06F 3/167 |
| 2019/0066680 A1* | 2/2019 | Woo | G10L 15/08 |
| 2019/0286153 A1* | 9/2019 | Rankawat | G06T 7/11 |
| 2019/0379682 A1* | 12/2019 | Overby | H04L 12/4641 |
| 2019/0392834 A1* | 12/2019 | Yi | G10L 15/08 |
| 2020/0363815 A1* | 11/2020 | Mousavian | G06K 9/00805 |

FOREIGN PATENT DOCUMENTS

| | | |
|---|---|---|
| KR | 10-2019-0010507 A | 1/2019 |
| KR | 10-2019-0039646 A | 4/2019 |

\* cited by examiner

[FIG. 1]
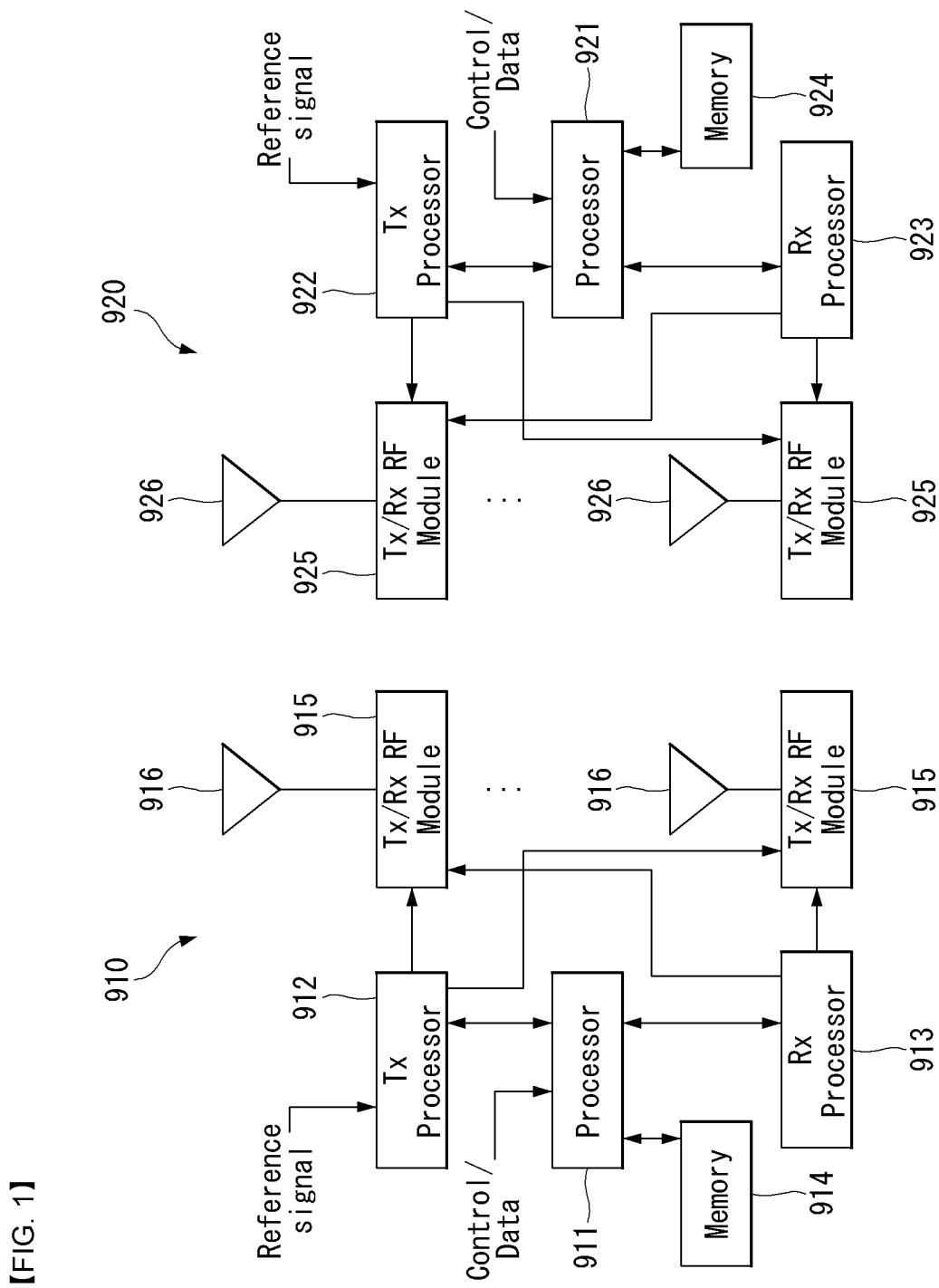

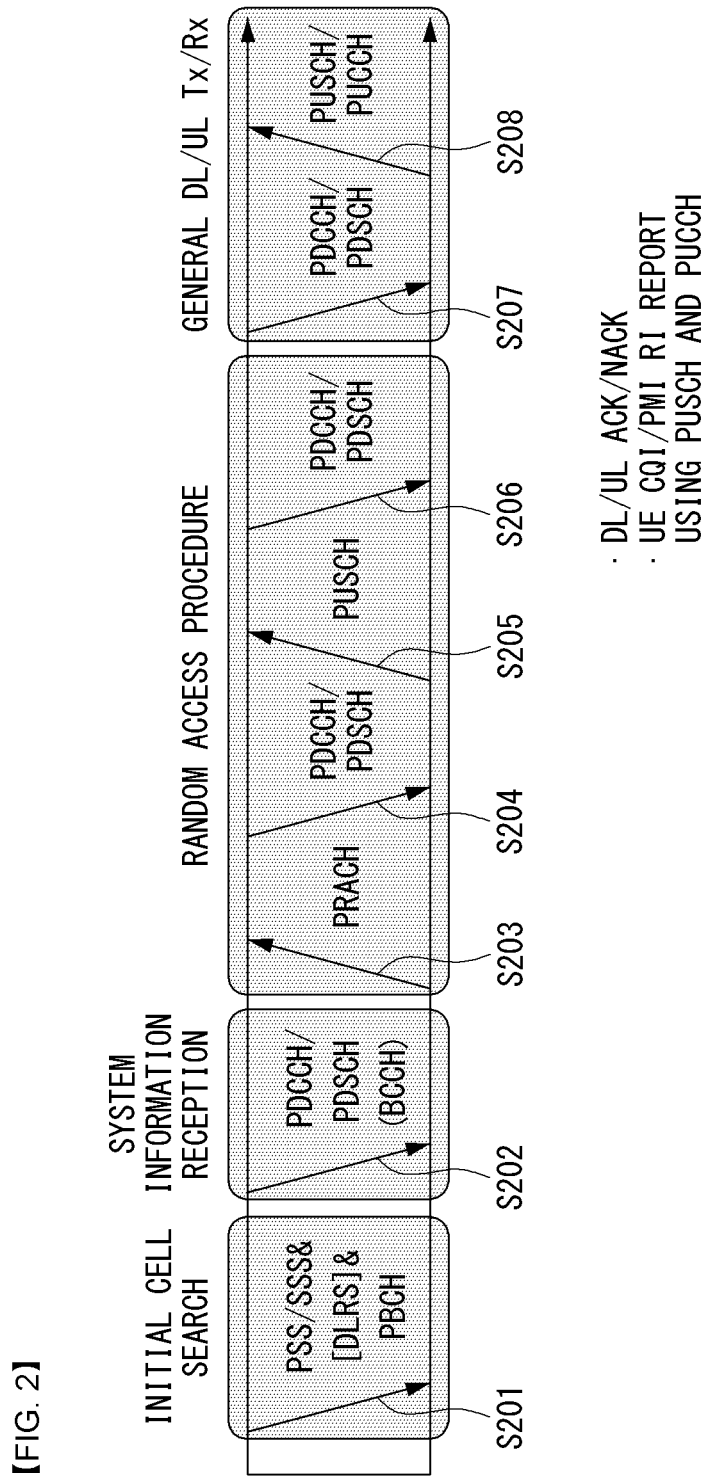

[FIG. 3]
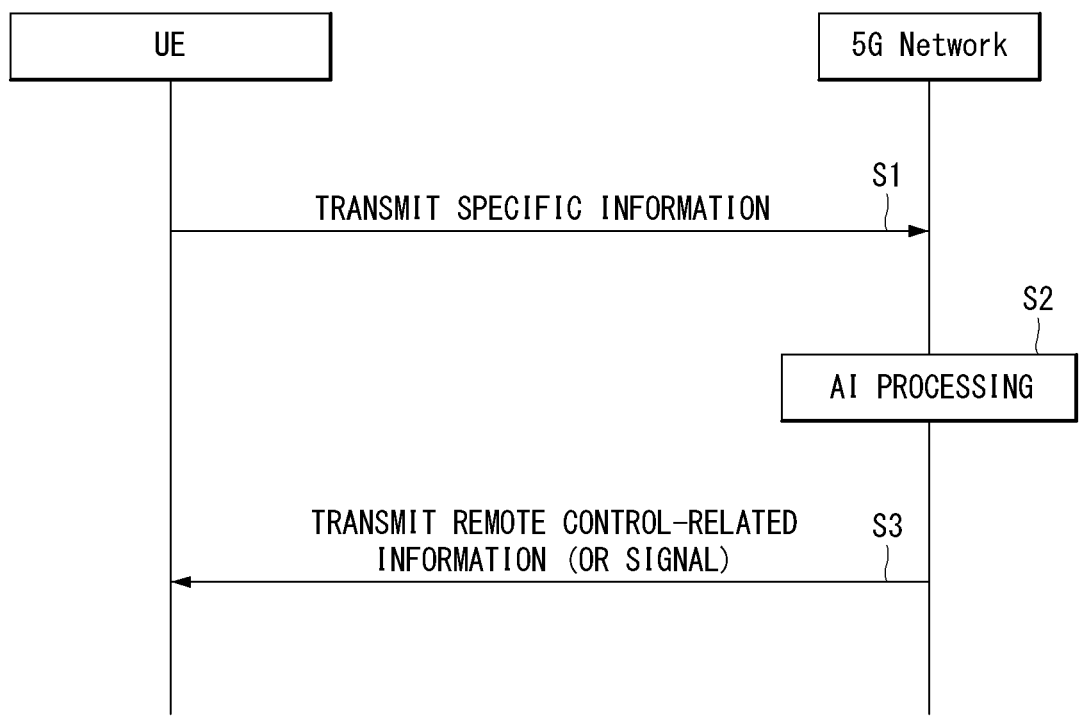

[FIG. 4]
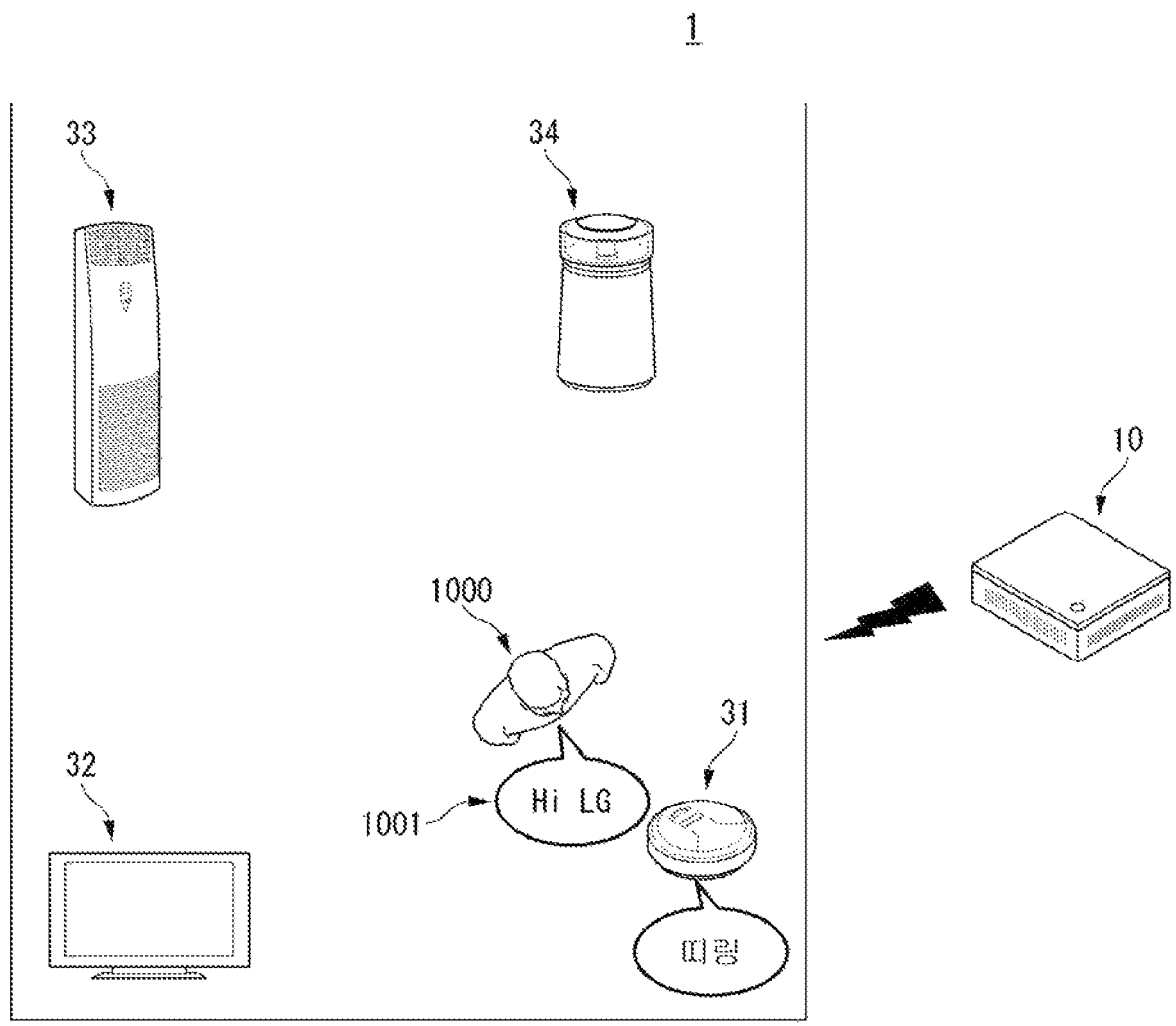

[FIG. 5]
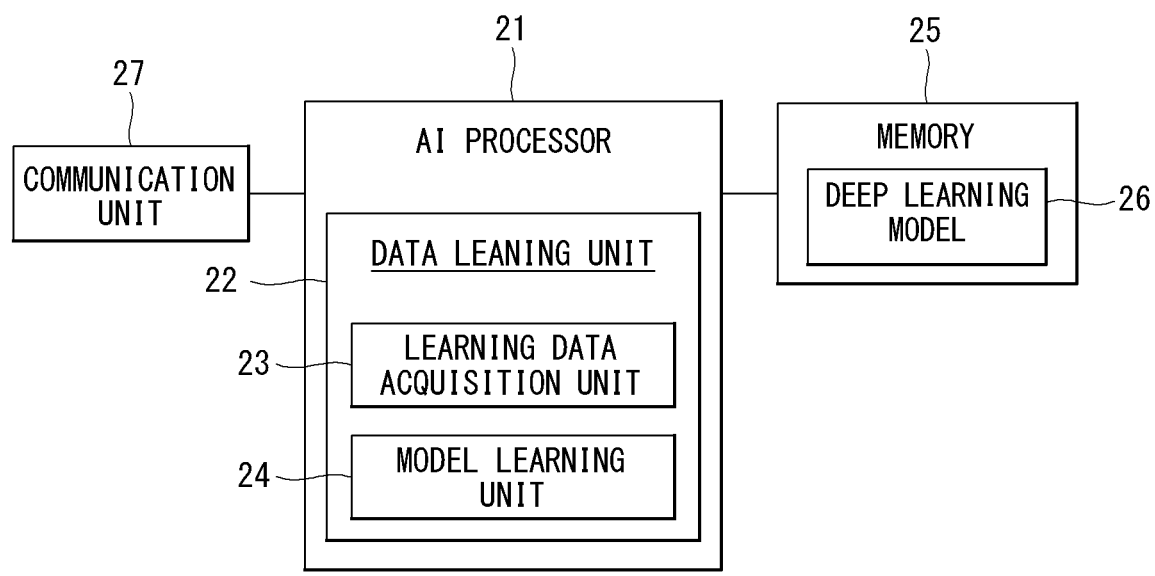

[FIG. 6]
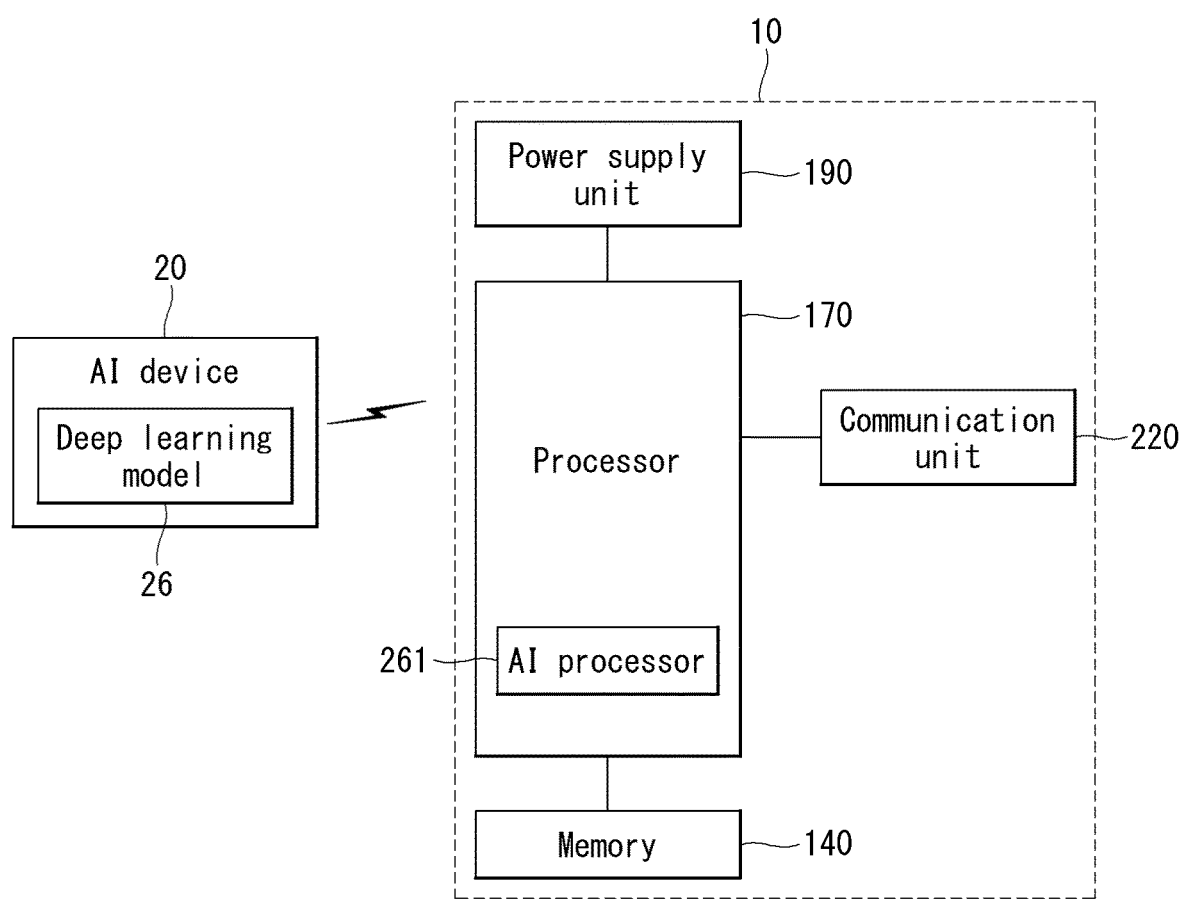

[FIG. 7]
S700
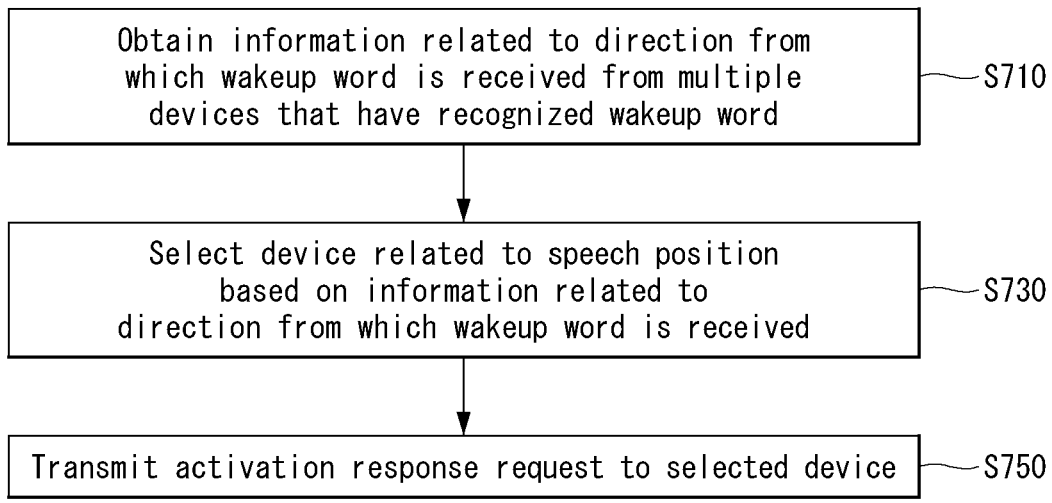
[FIG. 8]
S710
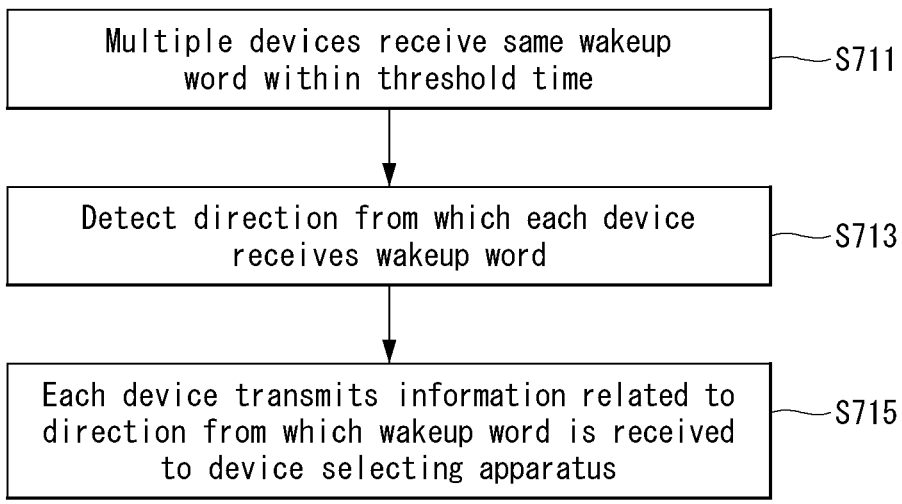

[FIG. 9]
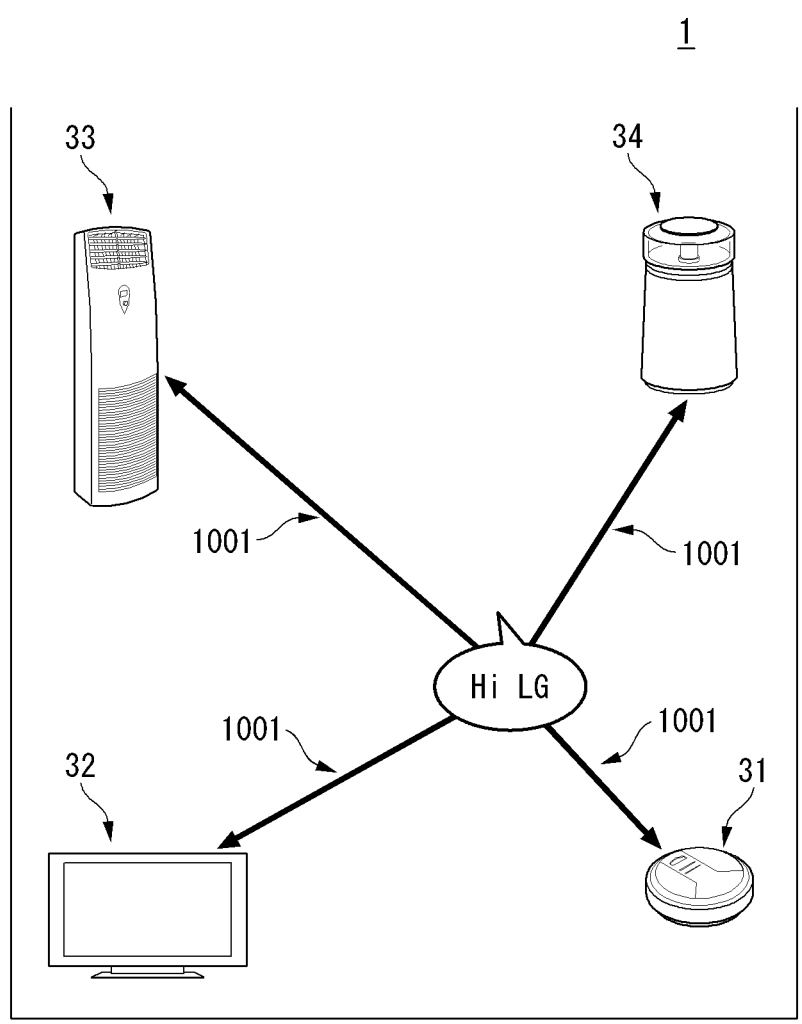

[FIG. 10]
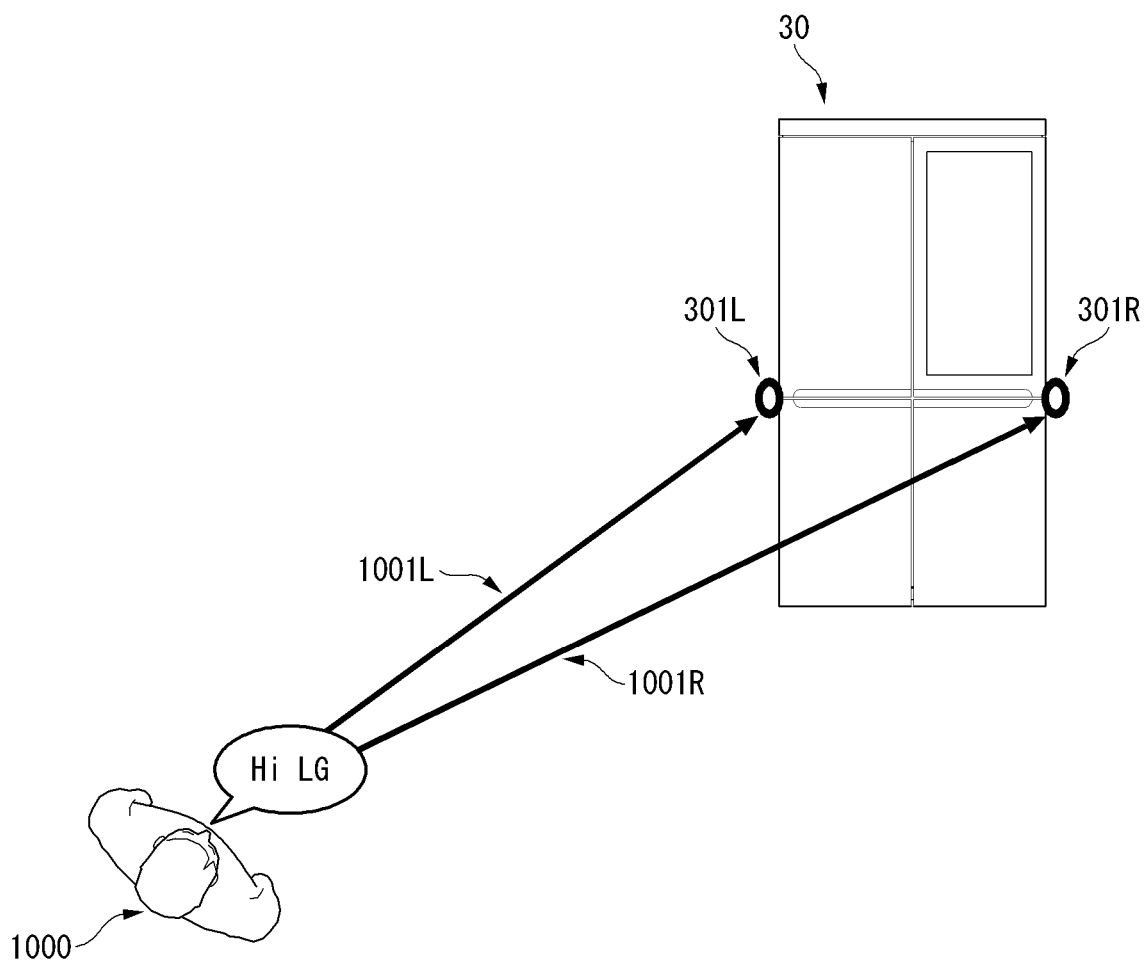

【FIG. 11】
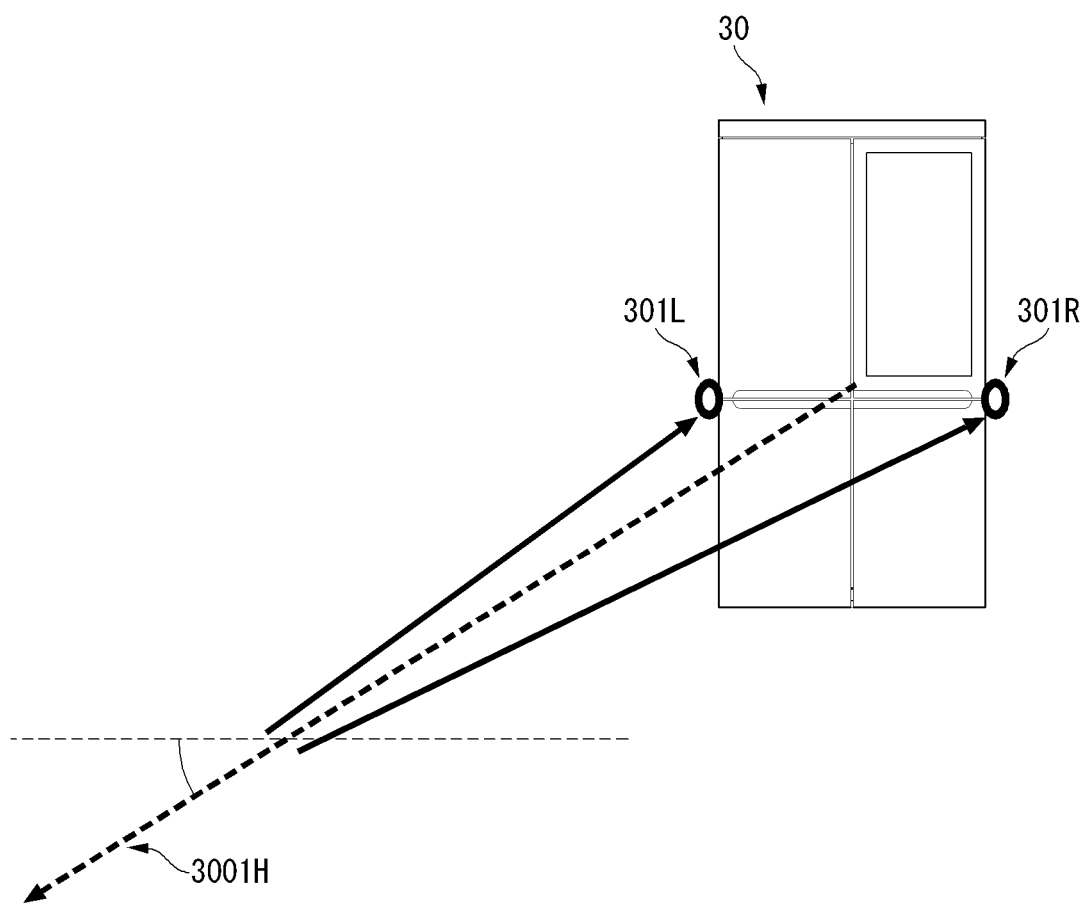

[FIG. 12]
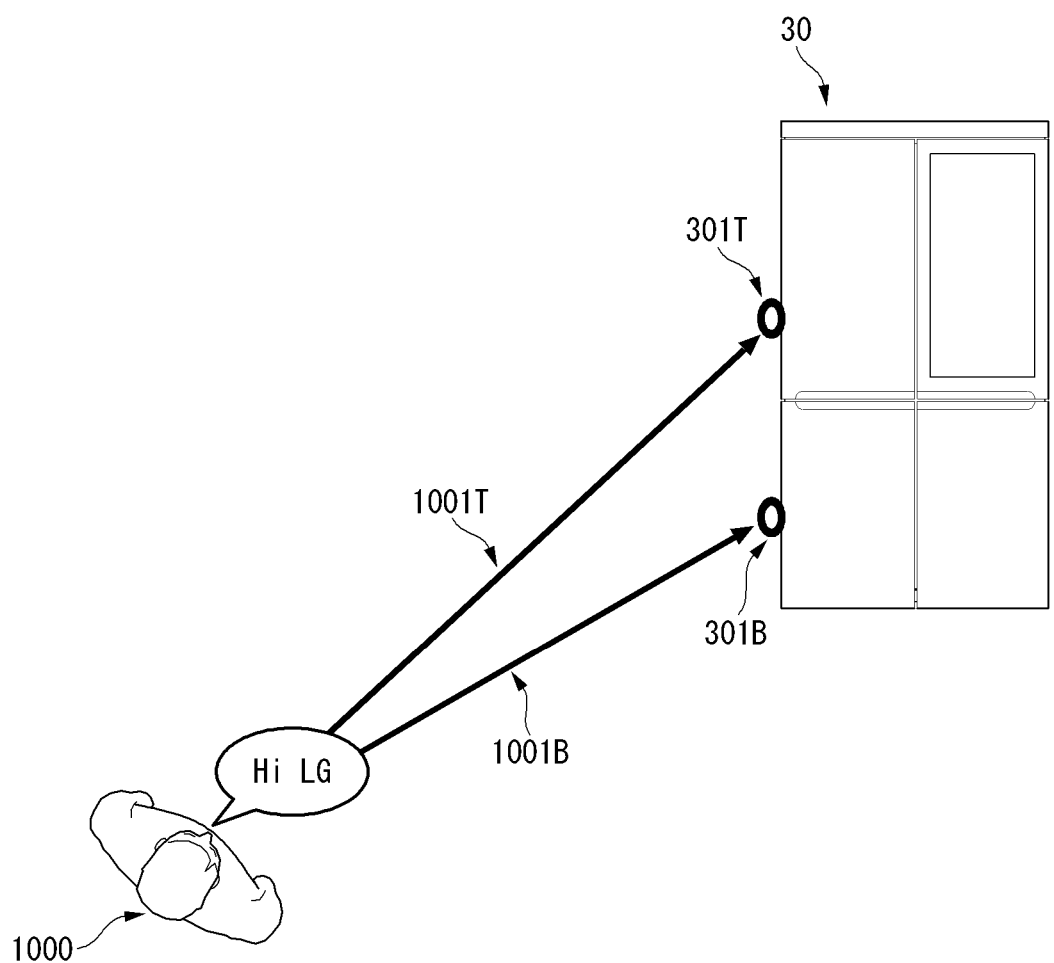

[FIG. 13]
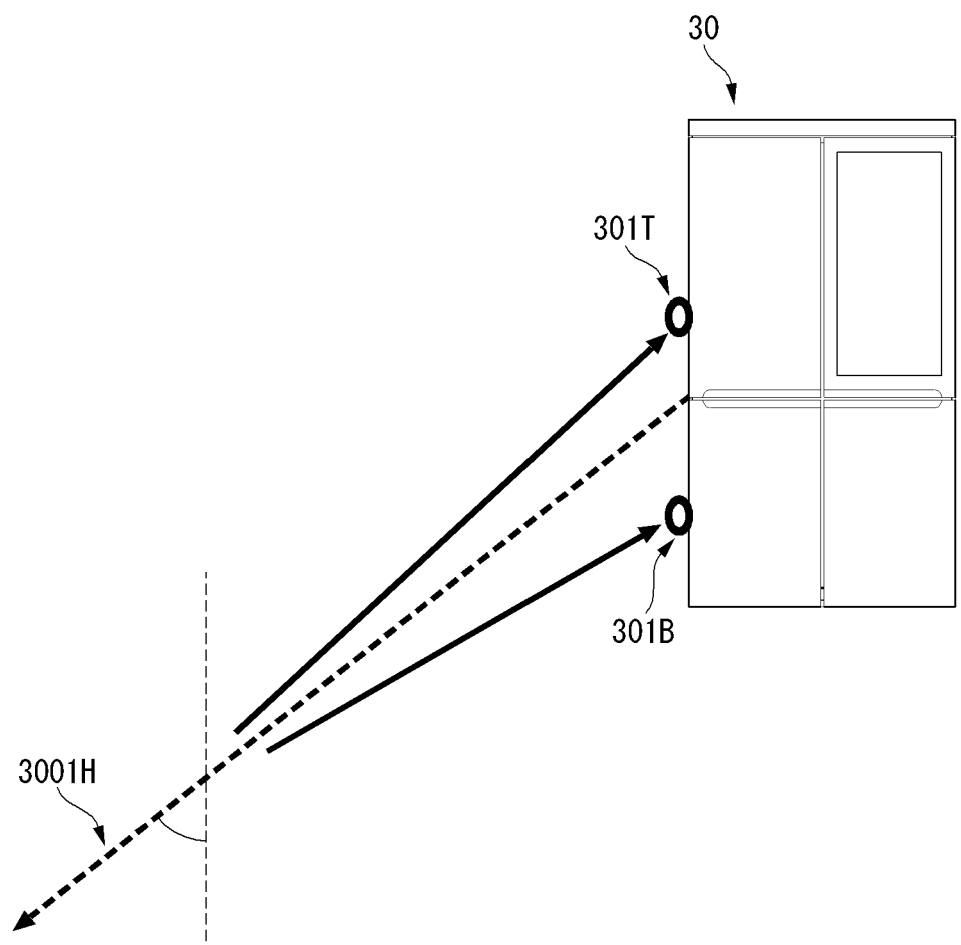

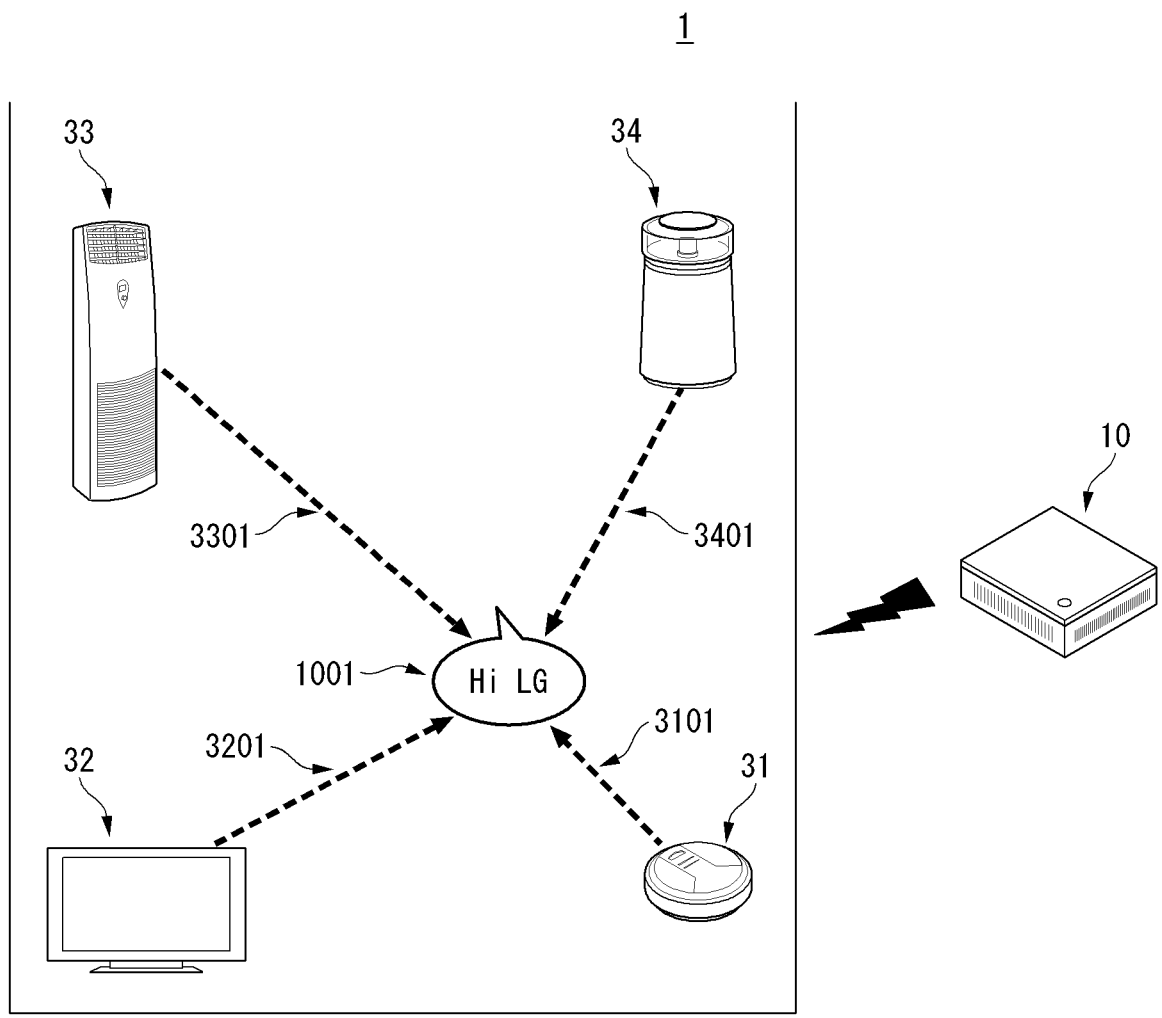
[FIG. 14]

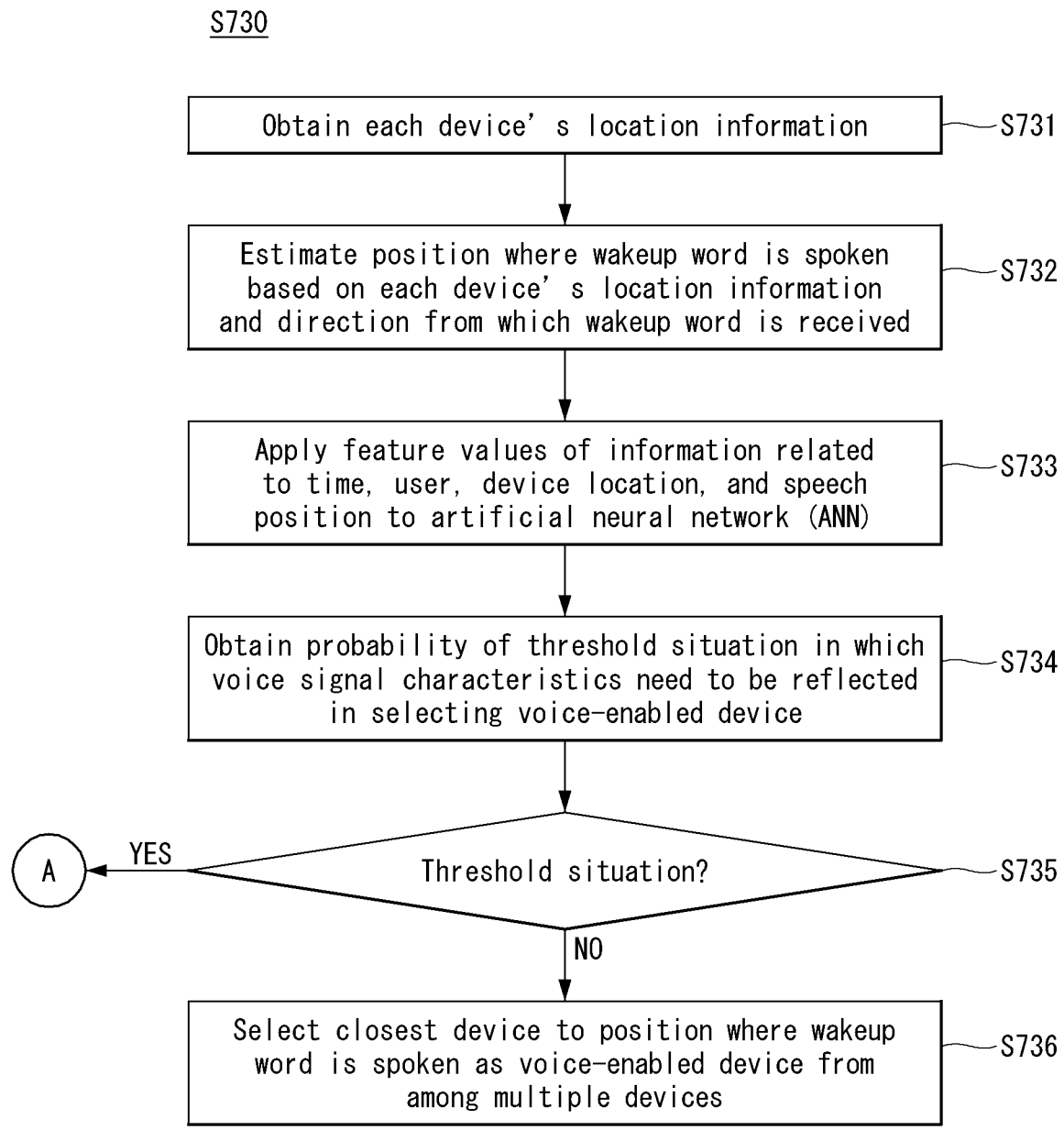
[FIG. 15]

【FIG. 16】
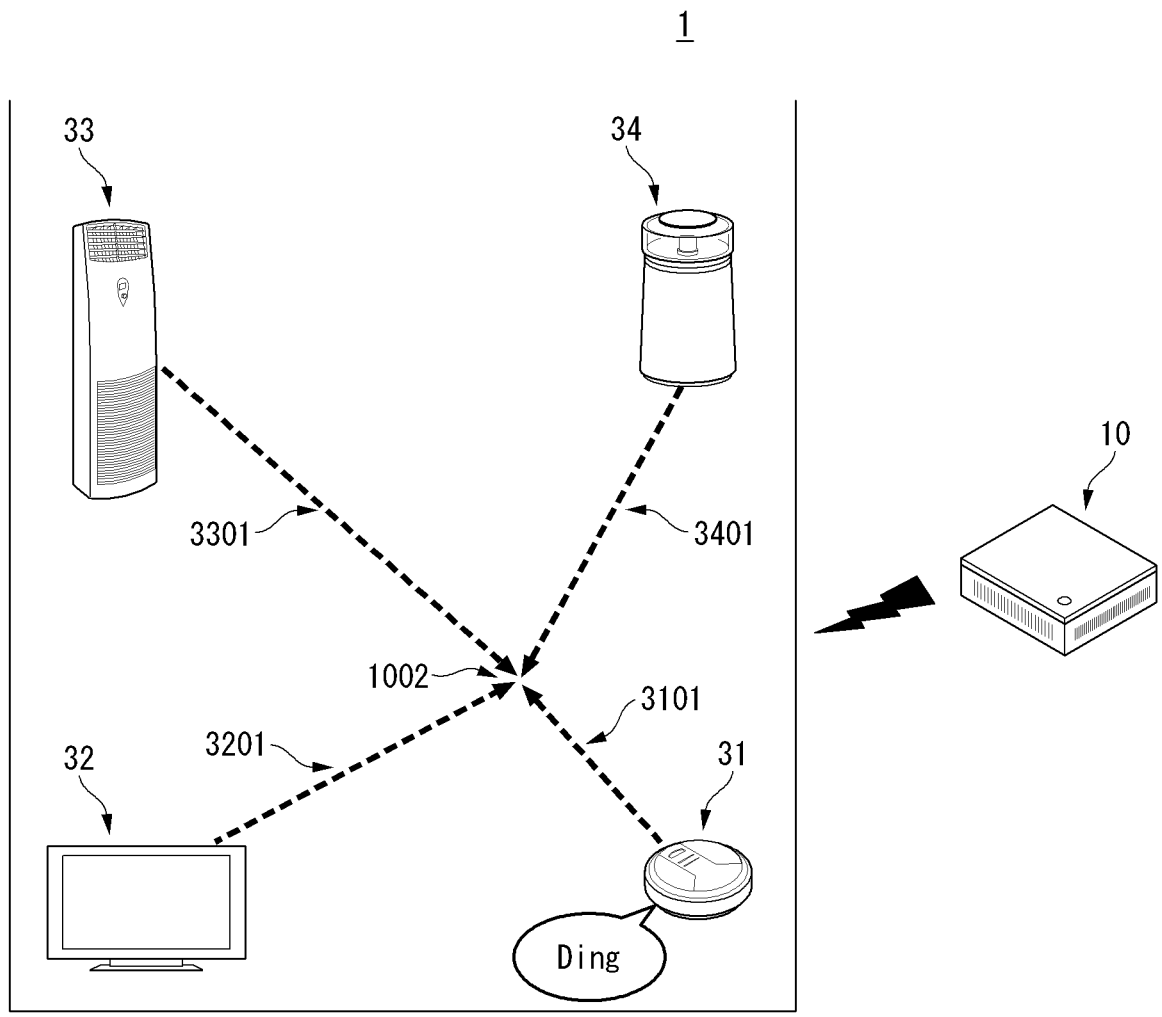

[FIG. 17]
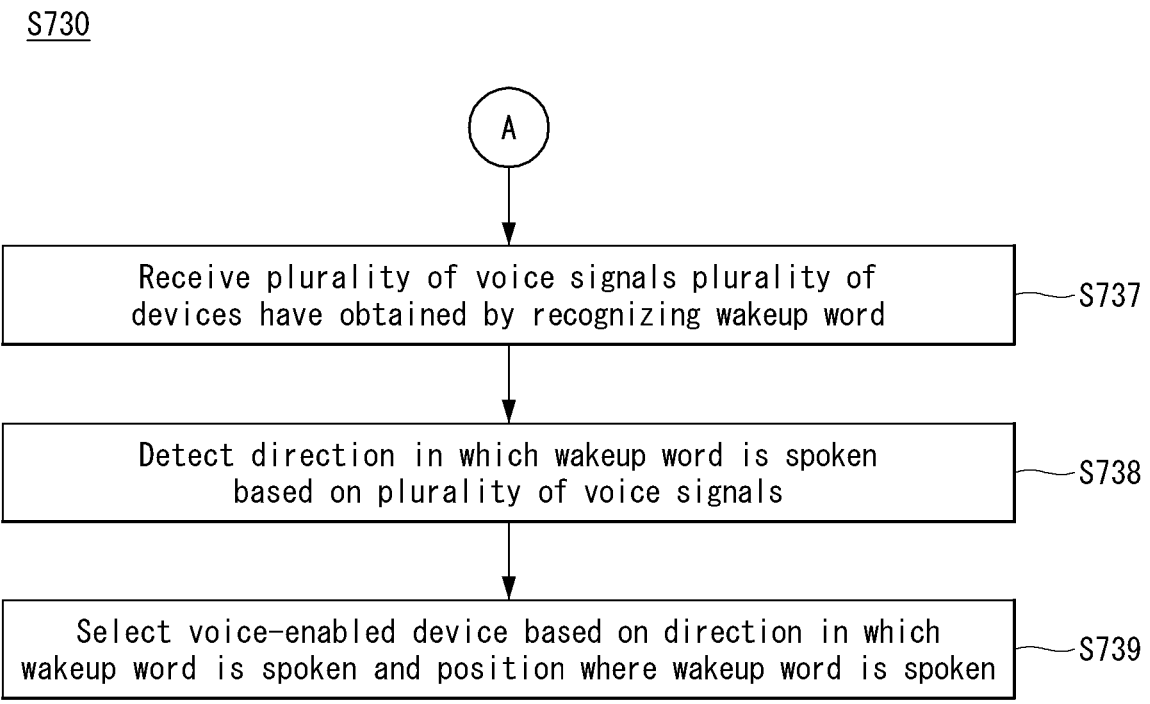

[FIG. 18]
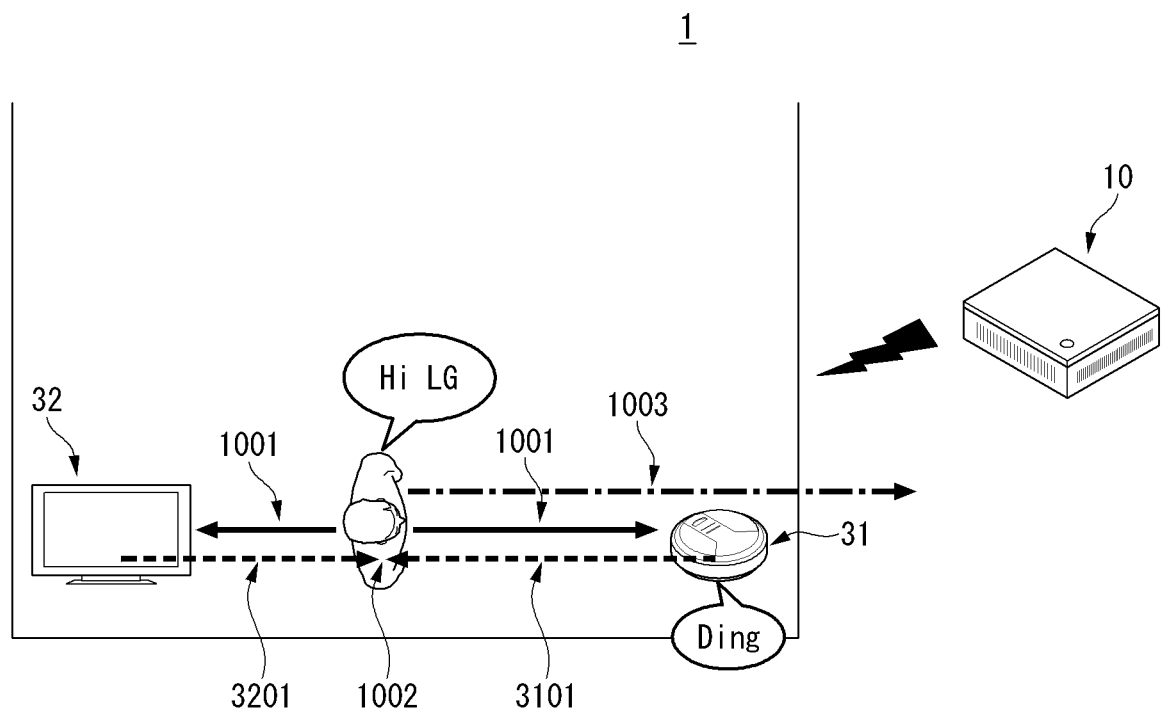

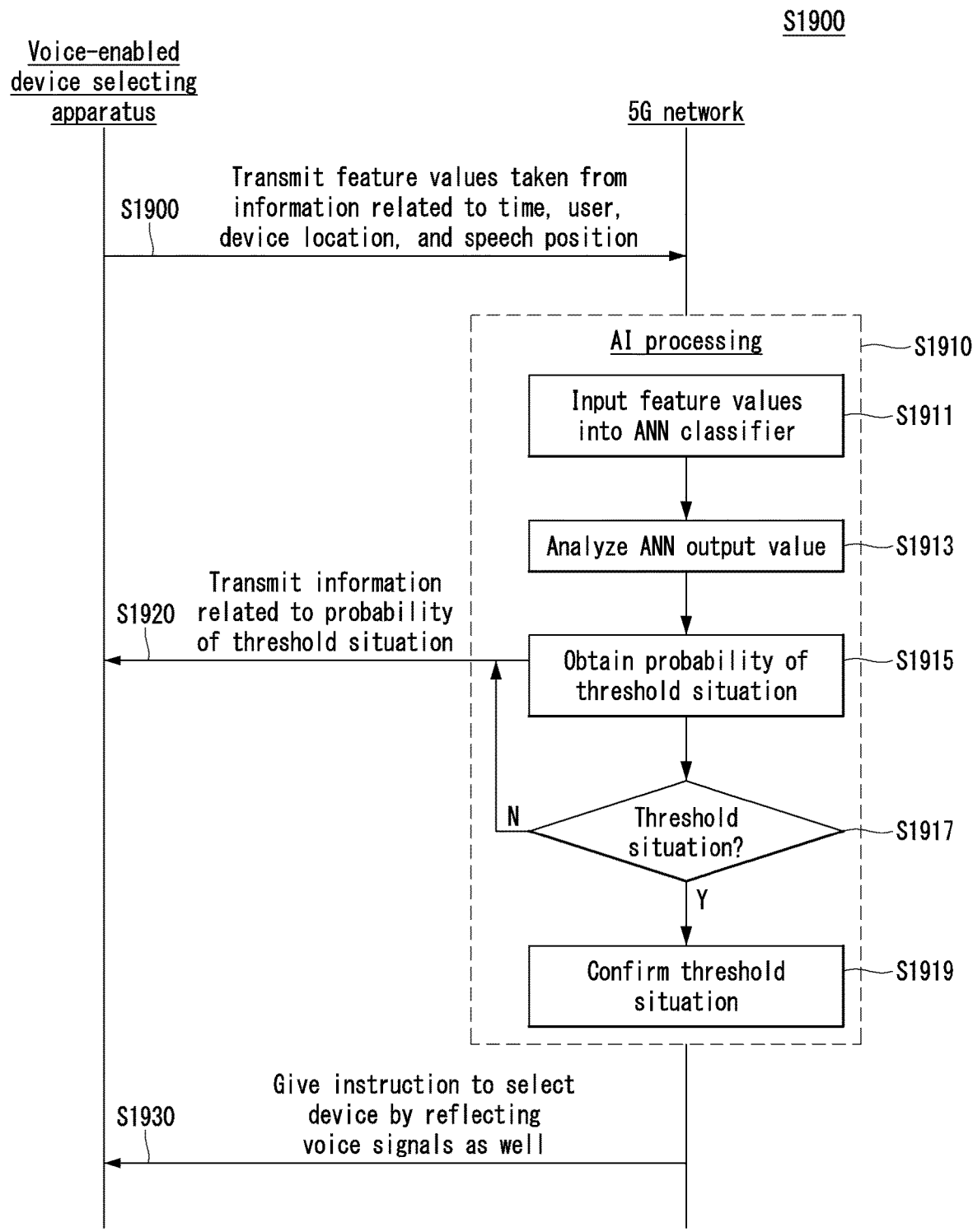

METHOD AND APPARATUS FOR SELECTING VOICE-ENABLED DEVICE

CROSS-REFERENCE TO RELATED APPLICATION(S)

This application is based on and claims priority under 35 U.S.C. 119 to Korean Patent Application No. 10-2019-0075770, filed on Jun. 25, 2019, in the Korean Intellectual Property Office, the disclosure of which is herein incorporated by reference in its entirety.

BACKGROUND OF THE INVENTION

Field of the Invention

The present invention relates to a method and apparatus for selecting a voice-enabled device and, more particularly, to a method and apparatus for selecting a voice-enabled device by reflecting information related to the direction from which a wakeup word is received and the direction in which the wakeup word is spoken.

Related Art

A voice-enabled device is a device that performs voice recognition. The voice-enabled device can obtain a voice signal by recognizing a user's speech it receives and perform a preset operation based on the result of analysis of the voice signal.

Driven by the development of voice recognition-related technologies and home IoT (Internet of Things)-related technologies (e.g., 5G communication technology), a home IoT server (voice-enabled device selecting apparatus) can receive voice signals a plurality of IoT devices (voice recognition devices) have obtained by recognizing a user's speech (wakeup word), and the home IoT server can select a response device (voice-enabled device) that will respond to the user's speech from among the plurality of IoT devices and activate it.

However, when selecting a response device using the voice signals the IoT devices have obtained, each IoT device may be different in terms of their device status in which they can receive the user's speech or in terms of the way they recognize the user's speech. This can lead to a failure to select the right response device that fits the intention of the user's speech.

Moreover, when each IoT device transmits a voice signal, which is relatively large in volume, to the home IoT server, communication overload occurs, and the home IoT server has to deal with an excessively large amount of computation.

SUMMARY OF THE INVENTION

An object of the present invention is to meet the needs and solve the problems.

Another aspect of the present invention is to select the right voice-enabled device a user intends to activate.

An exemplary embodiment of the present invention provides a method for selecting a voice-enabled device, the method including: obtaining information related to a wakeup word from a plurality of voice recognition devices; and selecting the voice-enabled device from among the plurality of voice-recognition devices based on the information related to the wakeup word, wherein the obtaining of information related to a wakeup word may include obtaining information related to the direction from which each voice recognition device receives the wakeup word from the plurality of voice recognition devices, and the selecting of the voice-enabled device may include: determining the position where the wakeup word is spoken based on the information related to the direction from which each voice recognition device receives the wakeup word; and selecting a voice recognition device related to the position where the wakeup word is spoken.

The selecting of the voice-enabled device may include selecting the voice recognition device closest to the position where the wakeup word is spoken from among the plurality of voice recognition devices.

The information related to the direction from which the wakeup word is received may include: information related to the vertical angle at which each voice recognition device receives the wakeup word; and information related to the horizontal angle at which each voice recognition device receives the wakeup word.

The determining of the position where the wakeup word is spoken may include: obtaining information related to the location of each voice recognition device; and estimating the position where the wakeup word is spoken by using the information related to the location of each voice recognition device and the information related to the direction from which the wakeup word is received.

The method may further include: obtaining information related to the situation in which each voice recognition device recognizes the wakeup word; and applying the information related to the situation in which the wakeup word is recognized to a pre-learned threshold situation detection and classification model, wherein the selecting of the voice-enabled device may include: determining whether the situation in which the wakeup word is recognized is a threshold situation based on the result of the application; and selecting the voice-enabled device using both the information related to the direction from which the wakeup word is received and a plurality of voice signals each voice recognition device obtains by recognizing the wakeup word.

The method may further include, if the situation in which the wakeup word is recognized is determined to be a threshold situation, obtaining the plurality of voice signals from the plurality of voice recognition devices, wherein the selecting of a voice recognition device may include: determining the direction in which the wakeup word is spoken based on the plurality of voice signals; and selecting a voice recognition device related to the position where the wakeup word is spoken.

The selecting of a voice recognition device may include selecting the voice recognition device closest to the position where the wakeup word is spoken from among at least one voice recognition device positioned in the direction in which the wakeup word is spoken.

The information related to the situation in which the wakeup word is spoken may include: information related to the time at which the wakeup word is recognized; information related to the user who is recognized as having spoken the wakeup word; information related to the location of each voice recognition device; and information related to the position where the wakeup word is spoken.

The threshold situation detection and classification model may be stored in an external artificial intelligence, AI, device, and the applying of the information related to the situation in which the wakeup word is recognized to the threshold situation detection and classification model may include: transmitting feature values related to the information related to the situation in which the wakeup word is spoken to the AI device; and obtaining, from the AI device, the result of applying he information related to the situation in which the wakeup word is recognized to the threshold situation detection and classification model.

The threshold situation detection and classification model may be stored in a network, and the applying of the information related to the situation in which the wakeup word is recognized to the threshold situation detection and classification model may include: transmitting the information related to the situation in which the wakeup word is spoken to the network; and obtaining, from the network, the result of applying the information related to the situation in which the wakeup word is recognized to the threshold situation detection and classification model.

The method may further include receiving, from the network, downlink control information, DCI, which is used to schedule the transmission of the information related to the situation in which the wakeup word is spoken, wherein the information related to the situation in which the wakeup word is spoken may be transmitted to the network based on the DCI.

The method may further include performing an initial access procedure with the network based on a synchronization signal block, SSB, wherein the information related to the situation in which the wakeup word is spoken may be transmitted to the network via a PUSCH, and the SSB and the DM-RS of the PUSCH are quasi co-located with QCL type D.

The method may further include: controlling a communication module to transmit the information related to the situation in which the wakeup word is spoken to an AI processor included in the network; and controlling the communication module to receive AI-processed information from the AI processor, wherein the AI-processed information may be information related to threshold situation probability for determining whether the situation in which the wakeup word is spoken is a threshold situation.

Another exemplary embodiment of the present invention provides an apparatus for selecting a voice-enabled device, the apparatus including: a communication module for obtaining information related to a wakeup word from a plurality of voice recognition devices; and a processor for selecting the voice-enabled device from among the plurality of voice-recognition devices based on the information related to the wakeup word, wherein the processor may obtain information related to the direction from which each voice recognition device receives the wakeup word from the plurality of voice recognition devices through the communication module, determine the position where the wakeup word is spoken based on the information related to the direction from which each voice recognition device receives the wakeup word, and select a voice recognition device related to the position where the wakeup word is spoken.

The processor may select the voice recognition device closest to the position where the wakeup word is spoken from among the plurality of voice recognition devices.

The information related to the direction from which the wakeup word is received may include: information related to the vertical angle at which each voice recognition device receives the wakeup word; and information related to the horizontal angle at which each voice recognition device receives the wakeup word.

The processor may obtain information related to the location of each voice recognition device through the communication module and estimate the position where the wakeup word is spoken by using the information related to the location of each voice recognition device and the information related to the direction from which the wakeup word is received.

The processor may: obtain information related to the situation in which each voice recognition device recognizes the wakeup word through the communication module; apply the information related to the situation in which the wakeup word is recognized to a pre-learned threshold situation detection and classification model; determine whether the situation in which the wakeup word is recognized is a threshold situation based on the result of the application, and select the voice-enabled device using both the information related to the direction from which the wakeup word is received and a plurality of voice signals each voice recognition device obtains by recognizing the wakeup word.

If the situation in which the wakeup word is recognized is determined to be a threshold situation, the processor may obtain the plurality of voice signals from the plurality of voice recognition devices through the communication module, determine the direction in which the wakeup word is spoken based on the plurality of voice signals, and select a voice recognition device related to the position where the wakeup word is spoken.

The processor may select the voice recognition device closest to the position where the wakeup word is spoken from among at least one voice recognition device positioned in the direction in which the wakeup word is spoken.

The information related to the situation in which the wakeup word is spoken may include: information related to the time at which the wakeup word is recognized; information related to the user who is recognized as having spoken the wakeup word; information related to the location of each voice recognition device; and information related to the position where the wakeup word is spoken.

The threshold situation detection and classification model may be stored in an external artificial intelligence, AI, device, and the processor may transmit feature values related to the information related to the situation in which the wakeup word is spoken to the AI device and obtain, from the AI device, the result of applying he information related to the situation in which the wakeup word is recognized to the threshold situation detection and classification model.

The threshold situation detection and classification model may be stored in a network, and the processor may transmit the information related to the situation in which the wakeup word is spoken to the network and obtain, from the network, the result of applying he information related to the situation in which the wakeup word is recognized to the threshold situation detection and classification model.

The processor may receive, from the network, downlink control information, DCI, which is used to schedule the transmission of the information related to the situation in which the wakeup word is spoken, wherein the information related to the situation in which the wakeup word is spoken may be transmitted to the network based on the DCI.

The processor may perform an initial access procedure with the network based on a synchronization signal block, SSB, wherein the information related to the situation in which the wakeup word is spoken may be transmitted to the network via a PUSCH, and the SSB and the DM-RS of the PUSCH are quasi co-located with QCL type D.

The processor may control a communication module to transmit the information related to the situation in which the wakeup word is spoken to an AI processor included in the network and control the communication module to receive AI-processed information from the AI processor, wherein the AI-processed information may be information related to threshold situation probability for determining whether the situation in which the wakeup word is spoken is a threshold situation.

Another exemplary embodiment of the present invention provides a recording medium, which is a non-transitory, computer-readable medium storing a computer-executable component configured to be executed by one or more processors of a computing device, wherein the computer-executable component may obtain information related to the direction from which each voice recognition device receives a wakeup word from a plurality of voice recognition devices, determine the position where the wakeup word is spoken based on the information related to the direction from which each voice recognition device receives the wakeup word, and select a voice recognition device related to the position where the wakeup word is spoken. 효과부분은 맨뒤로 이동

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 shows a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a view showing a home IoT system according to an exemplary embodiment of the present invention.

FIG. 5 shows a block diagram of an AI device that may be applied to one embodiment of the present invention.

FIG. 6 shows an exemplary block diagram of a voice enable device selecting apparatus according to an embodiment of the present invention.

FIG. 7 is a flowchart showing a method for selecting a voice-enabled device according to an exemplary embodiment of the present invention.

FIG. 8 is a flowchart showing a method for obtaining information related to the direction in which a wakeup word is spoken as in FIG. 7.

FIG. 9 shows an example in which each voice recognition device receives a wakeup word as in the step S711 of FIG. 8

FIGS. 10 and 11 shown an example in which a voice recognition device receives a wakeup word using a plurality of microphones and detects the horizontal angle in the step S713 of FIG. 8.

FIGS. 12 and 13 show an example in which a voice recognition device receives a wakeup word using a plurality of microphones and detects the vertical angle in the step S713 of FIG. 8.

FIG. 14 shows an example in which a voice-enabled device selecting apparatus obtains information related to the direction from which a wakeup word is received from a plurality of voice recognition devices, as in the step S715 of FIG. 8.

FIG. 15 is a flowchart showing a method for selecting a voice-enabled device according to an exemplary embodiment of the present invention.

FIG. 16 shows an example in which the closest device to the position where a wakeup word is spoken is selected and asked for an activation response, as in the step S736 of FIG. 15.

FIG. 17 is a flowchart showing a procedure A which is performed when a threshold situation is detected in the step S735 of FIG. 15.

FIG. 18 shows an example in which a voice-enabled device is selected using the method of FIG. 17.

FIG. 19 is a flowchart showing a method for detecting a threshold situation using a 5G network.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

In the specification below, a home IoT server may be defined as a voice-enabled device selecting apparatus for selecting a voice-enabled device, and a home IoT device may be defined as a voice recognition device for recognizing a wakeup word. The wakeup word may be defined as a user's speech for activating a specific IoT device.

FIG. 4 is a view showing a home IoT system according to an exemplary embodiment of the present invention.

As shown in FIG. 4, according to the exemplary embodiment of the present invention, the home IoT system 1 may include a plurality of voice recognition devices (IoT devices) 31, 32, 33, and 34.

When the user speaks a wakeup word 1001 ("Hi LG"), the voice recognition devices 31, 32, 33, and 34 may receive the wakeup word 1001. For example, each voice recognition devices 31, 32, 33, and 34 may receive the wakeup word 1001 using a plurality of microphones (not shown) included in each voice recognition device 31, 32, 33, and 34. Here, each voice recognition device 31, 32, 33, and 34 may receive the wakeup word 1001 from a different direction.

Upon receiving the wakeup word 1001, the voice recognition devices 31, 32, 33, and 34 may create information related to the direction from which the wakeup word 1001 is received.

The voice recognition devices 31, 32, 33, and 34 may transmit, to a voice-enabled device selecting apparatus 10, the created information related to the direction from which the wakeup word is received. Here, the voice recognition devices 31, 32, 33, and 34 may transmit, to the voice-enabled device selecting apparatus 10, the information related to the direction from which the wakeup word 1001 is received, by using a 5G communication technology (e.g., NB-IoT technology).

Upon obtaining, from each of the voice recognition devices 31, 32, 33, and 34, the information related to the direction from which the wakeup word is received, the voice-enabled device selecting apparatus 10 may select a device related to the position where the wakeup word is spoken (or the user's location) based on the information related to the direction from which the wakeup word is received.

After selecting the voice recognition device 31 closest to the position where the wakeup word is spoken as a voice-enabled device, the voice-enabled device selecting apparatus 10 may transmit an activation request to the selected voice-enabled device 31 to get it activated by the wakeup word 1001 and output an activation response.

Having received the activation request, the voice-enabled device 31 may be activated and output an activation response ("ding").

FIG. 5 shows a block diagram of an AI device that may be applied to one embodiment of the present invention.

The AI device 20 may include an electronic device including an AI module capable of performing AI processing or a server including the AI module. In addition, the AI device 20 may be included in at least a part of the voice enable device selecting apparatus 10 illustrated in FIG. 4 and may be provided to perform at least some of the AI processing together.

The AI processing may include all operations related to the control of the voice enabled device selection apparatus 10 shown in FIG. 4. For example, the voice enabled device selection apparatus 10 may perform processing/decision and control signal generation by AI processing sensing data or acquired data transmitted from each IoT device. Also, for example, the voice enable device selection apparatus 10 may perform AI control of data received through the communication unit to perform control of the voice enable device selection apparatus.

The AI device 20 may be a client device that directly uses the AI processing result or may be a device in a cloud environment that provides the AI processing result to another device.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25. In particular, the AI processor 21 may train a neural network for recognizing data related to the voice-enabled device selecting apparatus. For example, the AI processor 21 may train a neural network for recognizing activation situation information (for example, information related to the time slot during which the wakeup word is spoken, information related to the user who is recognized as having spoken the wakeup word, voice recognition device location information, and speech position information) and for classifying whether a current situation is a threshold situation in which voice signal characteristics, as well as the direction from which the wakeup word is received, need to be reflected in selecting a voice-enabled device. In this case, the neural network for outputting estimated noise information may be designed to simulate the human's brain structure on a computer, and may include a plurality of network nodes having weight and simulating the neurons of the human's neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice output, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtained learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data obtaining unit 23 and a model learning unit 24.

The learning data acquisition unit 23 may obtain training data for a neural network model for classifying and recognizing data. For example, the learning data acquisition unit 23 may obtain microphone detection signal to be input to the neural network model and/or a feature value, extracted from the message, as the training data.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor may pre-process an obtained operating state so that the obtained operating state may be used for training for recognizing estimated noise information. For example, the learning data preprocessor may process an obtained operating state in a preset format so that the model training unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model training unit 24. For example, the training data selection unit may select only data for a syllable, included in a specific region, as training data by detecting the specific region in the feature values of an operating state obtained by the voice enable device selecting apparatus 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

The external electronic device may include a voice enable device selection device, a robot, a drone, an AR device, a mobile device, a home appliance, and the like.

For example, when the external electronic device is a voice enable device selection device, the AI device 20 may be defined as an IoT device, another voice enable device selection device, or a 5G network that communicates with the voice enable device selection device. Meanwhile, the AI device 20 may be implemented by being functionally embedded in a processor included in the voice enabled device selection device. In addition, the 5G network may include a server or a module that performs AI processing.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is an exemplary block diagram of a voice output apparatus according to an embodiment of the present invention.

Referring to FIG. 6, the voice enable device selection apparatus 10 may 10o transmit data requiring AI processing to the AI device 20 through a communication unit, and the AI device 20 including the deep learning model 26 may transmit the AI processing result using the deep learning model 26 to the voice enable device selection apparatus 10. The AI device 20 may refer to the contents described with reference to FIG. 5.

The voice enabled device selection apparatus 10 may include a memory 140, a processor 170, and a power supply 190, and the processor 170 may further include an AI processor 261.

The interface unit may include at least one of a communication module, a terminal, a pin, a cable, a port, a circuit, an element, and an apparatus.

The memory 140 is electrically connected to the processor 170. The memory 140 may store basic data for the unit, control data for controlling the operation of the unit, and input/output data. The memory 140 may store data processed by the processor 170. The memory 140 may be configured in at least one of a ROM, a RAM, an EPROM, a flash drive, and a hard drive in hardware. The memory 140 may store various data for operations of the overall voice enabled device selection apparatus 10, such as a program for processing or controlling the processor 170. The memory 140 may be integrated with the processor 170. According to an embodiment, the memory 140 may be classified into sub-components of the processor 170.

The power supply unit 190 may supply power to the voice enabled device selection device 10. The power supply unit 190 receives power from a power source (for example, a battery) included in the voice enable device selection apparatus 10, and supplies power to each unit of the voice enable device selection apparatus 10. The power supply unit 190 may be operated according to a control signal provided from the main ECU 240. The power supply unit 190 may include a switched-mode power supply (SMPS).

The processor 170 may be electrically connected to the memory 140, the interface unit 280, and the power supply unit 190 to exchange signals. The processor 170 may include at least one of application specific integrated circuits (ASICs), digital signal processors (DSPs), digital signal processing devices (DSPDs), programmable logic devices (PLDs), field programmable gate arrays (FPGAs), processors, and controllers, micro-controllers, microprocessors, and electrical units for performing other functions.

The processor 170 may be driven by the power supplied from the power supply 190. The processor 170 may receive data, process data, generate a signal, and provide a signal while the power is supplied by the power supply 190.

The processor 170 may receive information from another electronic device in the voice enabled device selection device 10. The processor 170 may provide a control signal to another electronic device in the voice enabled device selection device 10 through the interface unit.

The voice enabled device selection apparatus 10 may include at least one printed circuit board (PCB). The memory 140, the interface unit, the power supply unit 190, and the processor 170 may be electrically connected to the printed circuit board.

Hereinafter, other electronic devices and the AI processor 261 which are within the voice-enabled device selecting apparatus connected to the interface will be described in more concrete details.

Meanwhile, the voice-enabled device selecting apparatus 10 may transmit activation situation information (for example, information related to the time slot during which the wakeup word is spoken, information related to the user who is recognized as having spoken the wakeup word, voice recognition device location information, and speech position information) to the AI device 20 through the communication unit 220, and the AI device 20 may transmit AI-processed data, created by applying the neural network model 26 to the received data, to the voice-enabled device selecting apparatus 10. Based on the received AI-processed data, the voice-enabled device selecting apparatus 10 may recognize the probability that the current situation is a threshold situation in which voice signal characteristics, as well as the direction from which the wakeup word is received, need to be reflected in selecting a voice-enabled device, and reflect a voice signal recognized by each voice recognition device in selecting a voice-enabled device based on the probability of a threshold situation.

The communicator 220 may exchange signals with a device located outside the voice enabled device selection apparatus 10. The communication unit 220 may exchange a signal with at least one of an infrastructure (for example, a server and a broadcasting station), an IoT device, another voice enabled device selection device, and a terminal. The communicator 220 may include at least one of a transmit antenna, a receive antenna, a radio frequency (RF) circuit capable of implementing various communication protocols, and an RF element to perform communication.

Meanwhile, the AI processor 261 may create information related to the probability of a threshold situation in which voice signal characteristics, as well as the direction from which the wakeup word is received, need to be reflected in selecting a voice-enabled device, by using the activation situation information transmitted from each IoT device (for example, information related to the time slot during which the wakeup word is spoken, information related to the user who is recognized as having spoken the wakeup word, voice recognition device location information, and speech position information).

According to the exemplary embodiment of the present invention, the communication unit 220 may obtain activation situation information. The communication unit 220 may pass the obtained activation situation information to the processor 170.

According to the exemplary embodiment of the present invention, the processor 170 may calculate the probability that the current situation is a threshold situation, by using the activation situation information passed from the communication unit 220. Based on the probability that the current situation is a threshold situation, the processor 170 may determine whether to reflect a voice signal recognized by each voice recognition device in selecting a voice-enabled device.

As above, referring to FIGS. 1 to 6, an overview has been provided of a 5G communication technology needed to implement the method for selecting a voice-enabled device according to an exemplary embodiment of the present invention, and of how the 5G communication technology is applied to perform AI processing and transmit and receive AI processing results.

According to the conventional art, the home IoT server may analyze the characteristics (e.g., SNR) of a voice signal transmitted from each IoT device, select the IoT device closest to the position where the wakeup word is spoken as a voice-enabled device from among a plurality of IoT devices based on the analysis results, and ask it to respond to the wakeup word, and the IoT device selected as a voice-enabled device may respond to the wakeup word.

However, in actual usage, each IoT device may be different in terms of their device status (e.g., microphone position) or in terms of the way they recognize the wakeup word (e.g., recognition algorithm). That is, even when different IoT devices located at the same distance from the position where the wakeup word is spoken receive the same wakeup word, the voice signal obtained by each IoT device may be different.

Accordingly, the distance between each IoT device and the position where the wakeup word is spoken may not be correctly reflected in the result of the home IoT server's analysis of each voice signal. Thus, another IoT device, other than the IoT device closest to the position where the wakeup word is spoken (the IoT device the user intends to activate), may be selected as a voice-enabled device and respond to the wakeup word.

Hereinafter, a method for selecting the right voice-enabled device that fits the intention of a user's speech will be described in details with reference to FIGS. 7 to 19.

FIG. 7 is a flowchart showing a method for selecting a voice-enabled device according to an exemplary embodiment of the present invention.

As shown in FIG. 7, a method S700 for a voice-enabled device selecting apparatus (e.g., the voice-enabled device selecting apparatus 10 of FIG. 6) to select a voice-enabled device according to an exemplary embodiment of the present invention may include the steps S710, S730, and S750. A detailed description of this will be given below.

First of all, according to the exemplary embodiment of the present invention, the voice-enabled device selecting apparatus 10 may obtain information related to the direction in which a wakeup word is spoken from a plurality of voice recognition devices that have recognized the wakeup word (S710).

For example, the processor 170 of the voice-enabled device selecting apparatus 10 may receive information related to the direction in which a wakeup word is spoken, from a plurality of voice recognition devices 31, 32, 33, and 34 that have recognized the wakeup word by using the communication unit 220.

For example, the information related to the direction in which the wakeup word is spoken may include information related to the angle at which each voice recognition device 31, 32, 33, and 34 receives the wakeup word. Here, the information related to the angle at which the wakeup word is received may include information related to the vertical angle (or altitude) at which each voice recognition device 31, 32, 33, and 34 receives the wakeup word and information related to the horizontal angle (or azimuth) at which the wakeup word is received.

Next, according to the exemplary embodiment of the present invention, the processor 170 may select a voice recognition device related to the position where the wakeup word is spoken as a voice-enabled device based on the information related to the direction from which the wakeup word is received, which is obtained from each voice recognition device (S730).

For example, upon obtaining the position where the wakeup word is spoken, the processor 170 may select the voice recognition device closest to the position where the wakeup word is spoken as a voice-enabled device. As another example, upon obtaining the position where the wakeup word is spoken, the processor 170 may obtain information related to the direction in which the user 1000 speaks the wakeup word and select the voice recognition device closest to the position where the wakeup word is spoken as a voice-enabled device from among at least one voice recognition device positioned in the direction in which the wakeup word is spoken.

When determining the position where the wakeup word is spoken, the processor 170 may calculate the position where the wakeup word is spoken by using the direction from which the wakeup word is received. For example, the processor 170 may obtain information related to the location of each voice recognition device and calculate the position where the wakeup word is spoken using the information related to the location of each voice recognition device and the direction from which the wakeup word is received.

Lastly, according to the exemplary embodiment of the present invention, the processor 170 may transmit an activation response request to the selected voice-enabled device to respond to the wakeup word (S750).

FIG. 8 is a flowchart showing a method for obtaining information related to the direction in which a wakeup word is spoken as in FIG. 7.

As shown in FIG. 8, a method S710 in which the voice recognition devices 31, 32, 33, and 34 and voice-enabled device selecting apparatus 10 in the IoT system 1 obtain information related to the direction from which a wakeup word is received may include the steps S711, S713, and S715.

First of all, the voice recognition devices 31, 32, 33, and 34 may receive the same wakeup word within a threshold time (S711).

For example, the voice recognition devices 31, 32, 33, and 34 may receive a wakeup word 1001 spoken by the user 1000 within a threshold time (e.g., 1 second).

Subsequently, the voice recognition devices 31, 32, 33, and 34 may detect the direction from which each voice recognition device receives the wakeup word (S713).

For example, the voice recognition devices 31, 32, 33, and 34 may detect the direction (angle) (e.g., vertical and horizontal angles) at which the wakeup word 1001 is received by each voice recognition device 31, 32, 33, and 34 based on the speech position. Here, each voice recognition device 31, 32, 33, and 34 may include a plurality of microphones (not shown), and each voice recognition device 31, 32, 33, and 34 may create information related to the direction from which they receive the wakeup word 1001, by using the information related to the direction (angle) from which each microphone receives the wakeup word 1001.

Lastly, the voice recognition devices 31, 32, 33, and 34 may transmit the information related to the direction from which the wakeup word is received, created by each voice recognition device 31, 32, 33, and 34, to the voice-enabled device selecting apparatus 10 (S715).

FIG. 9 shows an example in which each voice recognition device receives a wakeup word as in the step S711 of FIG. 8.

As shown in FIG. 9, the voice recognition devices 31, 32, 33, and 34 of the home IoT system 1 may receive the same wakeup word 1001 ("Hi LG") spoken by the user within a threshold time.

Each voice recognition device 31, 32, 33, and 34 may include a plurality of microphones (not shown). Each voice recognition devices 31, 32, 33, and 34 may detect the direction from which the wakeup word 1001 is received through the microphones. Information related to the direction from which the wakeup word 1001 is received may include information related to the vertical angle and/or horizontal angle at which the wakeup word 1001 is received by each voice recognition device 31, 32, 33, and 34.

Each voice recognition device 31, 32, 33, and 34 may create information related to the detected direction from which the wakeup word is received, and store the information related to the direction from which the wakeup word is received in a memory (not shown) in each voice recognition device 31, 32, 33, and 34.

Here, a method for creating information related to the direction from which a wakeup word is received as in the step S713 of FIG. 3 will be described in details with reference to FIGS. 10 to 13.

FIGS. 10 and 11 shown an example in which a voice recognition device receives a wakeup word using a plurality of microphones and detects the horizontal angle in the step S713 of FIG. 8.

As shown in FIG. 10, the voice recognition device 30 may include a first microphone 301L provided on one side of the voice recognition device 30 and a second microphone 301R provided to the left side of the first microphone 301L. The first microphone 301L and the second microphone 301R may be positioned apart from each other on a horizontal plane by a predetermined horizontal distance.

The first microphone 301L may receive a first wakeup word signal 1001L spoken by the user 1000, and the second microphone 301R may receive a second wakeup word signal 1001R spoken by the user 1000.

As shown in FIG. 11, the first microphone 301L and second microphone 301R of the voice recognition device 30 may receive the first wakeup signal 1001L and the second wakeup signal 1001R, respectively, at different times.

In this case, the voice recognition device 30 may detect a wakeup word reception horizontal angle 3001H—the angle at which the wakeup word is received in a horizontal direction—by using the difference between the first time at which the first microphone 301L receives the first wakeup word signal 1001L and the second time at which the second microphone 301R receives the second wakeup word signal 1001R and the horizontal distance between the two microphones 301R and 301L.

FIGS. 12 and 13 show an example in which a voice recognition device receives a wakeup word using a plurality of microphones and detects the vertical angle in the step S713 of FIG. 8.

As shown in FIG. 12, the voice recognition device 30 may include a first microphone 301T provided on one side of the voice recognition device 30 and a second microphone 301B provided below the first microphone 301L. The first microphone 301T and the second microphone 301B may be positioned apart from each other on a vertical plane by a predetermined vertical distance.

The first microphone 301T may receive a first wakeup word signal 1001T spoken by the user 1000, and the second microphone 301B may receive a second wakeup word signal 1001B spoken by the user 1000.

As shown in FIG. 13, the first microphone 301T and second microphone 301B of the voice recognition device 30 may receive the first wakeup signal 1001T and the second wakeup signal 1001B, respectively, at different times.

In this case, the voice recognition device 30 may detect a wakeup word reception vertical angle 3001V—the angle at which the wakeup word is received in a vertical direction—by using the difference between the first time at which the first microphone 301T receives the first wakeup word signal 1001T and the second time at which the second microphone 301B receives the second wakeup word signal 1001B and the vertical distance between the two microphones 301T and 301B.

FIG. 14 shows an example in which a voice-enabled device selecting apparatus obtains information related to the direction from which a wakeup word is received from a plurality of voice recognition devices, as in the step S715 of FIG. 8.

As shown in FIG. 14, a plurality of voice recognition devices 31, 32, 33, and 34 of the home IoT system 1 may receive a wakeup word 1001 ("Hi LG") and detect the direction from which the wakeup word 1001 is received.

The voice recognition devices 31, 32, 33, and 34 may individually create information 3101, 3201, 3301, and 3401 related to the direction from which the wakeup word 1001 is received, and transmit the created information 3101, 3201, 3301, and 3401 related to the direction from which the wakeup word 1001 is received to the voice-enabled device selecting apparatus 10 over a 5G network.

The processor 170 of the voice-enabled device selecting apparatus 10 may select a voice-enabled device that will respond to the wakeup word 1001 from among the voice recognition devices 31, 32, 33, and 34 based on the information 3101, 3201, 3301, and 3401 related to the direction from which the wakeup word 1001 is received, which is obtained from the voice recognition devices 31, 32, 33, and 34. This will be described in details below with reference to FIGS. 15 to 19.

FIG. 15 is a flowchart showing a method for selecting a voice-enabled device according to an exemplary embodiment of the present invention.

As shown in FIG. 15, a method S730 for the processor 170 of the voice-enabled device selecting apparatus 10 to select a voice-enabled device that will respond to a wakeup word 1001 from among the voice recognition devices 31, 32, 33, and 34 may include the steps S731, S732, S734, S735, and S736. A detailed description of this will be given below.

First of all, the processor 170 may obtain information related to the location of each voice recognition device 31, 32, 33, and 34 through the communication unit 220 (S731).

For example, location information of each voice recognition device 31, 32, 33, and 34 may be pre-stored in the memory 140 of the voice-enabled device selecting apparatus 10. As another example, the processor 170 may ask each voice recognition device 31, 32, 33, and 34 for the location information of each voice recognition device 31, 32, 33, and 34, and may obtain the location information of each voice recognition device 31, 32, 33, and 34 as a response to this from each voice recognition device 31, 32, 33, and 34. As another example, the processor 170 may receive the location information of each voice recognition device 31, 32, 33, and 34 from the user through an external input device (not shown) or an internal input interface (not shown). As another example, the processor 170 may obtain the location information of each voice recognition device 31, 32, 33, and 34 from a main voice recognition device (or main IoT device) (e.g., home robot) among the voice recognition devices 31, 32, 33, and 34.

Next, the processor 170 may estimate the position where the wakeup word is spoken based on the location information of the voice recognition devices 31, 32, 33, and 34, which is obtained in the step S731, and the information related to the direction from which each voice recognition device 31, 32, 33, and 34 receives the wakeup word, which is obtained in the step S710 (S732).

Subsequently, the processor 170 may apply feature values of time information, user information, voice recognition device location information, and speech position-related information to an artificial neural network (ANN; or threshold situation classification model) (S733).

Here, the time information may include information related to the time at which the information related to the direction from which the wakeup word is received. The user information may include information related to the user or user account who is recognized as having spoken the wakeup word.

For example, the artificial neural network may be stored in the memory 140 of the voice-enabled device selecting apparatus 10, in which case the artificial neural network may be pre-trained by the processor 170. In another example, the artificial neural network may be included in a deep learning model 26 of the AI device 20 and trained by the AI device 20.

Upon receiving wakeup word recognition situation information including the time, user, device location, and speech position, the artificial neural network may output a probability value indicating whether the current wakeup word recognition situation is a threshold situation (a situation in which a voice-enabled device needs to be selected by reflecting the characteristics of voice signals as well as the information related to the direction in which the wakeup word is received). That is, the artificial neural network may be pre-trained by configuring input data related to the time, user, device location, and speech position and configuring output data indicating whether the current wakeup word recognition situation is a threshold situation.

Subsequently, as a result of applying the wakeup word recognition situation information including the time, user, device location, and speech position to the artificial neural network, the processor 170 may obtain the probability that the current wakeup word recognition situation is a threshold situation in which the voice signal characteristics need to be reflected in selecting a voice-enabled device, which is outputted from the artificial neural network (S734).

Next, the processor 170 may determine whether the current wakeup word recognition situation is a threshold situation based on the probability of a threshold situation obtained from the artificial neural network (S735).

For example, if the probability of a threshold situation is higher than a preset threshold, the processor 170 may determine that the current wakeup word recognition situation is a threshold situation. For example, if the probability of a threshold situation is less than the preset threshold, the processor 170 may determine that the current wakeup word recognition situation is not a threshold situation.

If the current wakeup word recognition situation is determined to be a threshold situation, the processor 170 may perform Process A, which will be described in detail with reference to FIG. 17.

If the current wakeup word recognition situation is determined to be a threshold situation, the processor 170 may determine that the current wakeup word recognition situation is a situation in which the characteristics of voice signals are not required in selecting a device, and select the closest device to the position where the wakeup word is spoken as a voice-enabled device from among the voice recognition devices (S736).

FIG. 16 shows an example in which the closest device to the position where a wakeup word is spoken is selected and asked for an activation response, as in the step S736 of FIG. 15.

As shown in FIG. 16, the voice-enabled device selecting apparatus 10 of the home IoT system 1 may obtain information 3101, 3201, 3301, and 3401 related to the direction from which each of a plurality of voice recognition devices 31, 32, 33, and 34 receives a wakeup word, from the voice recognition devices 31, 32, 33, and 34 over a 5G network.

Upon obtaining, from the voice recognition devices 31, 32, 33, and 34, the information 3101, 3201, 3301, and 3401 related to the direction from which each voice recognition device 31, 32, 33, and 34 receives the wakeup word, the processor 170 of the voice-enabled device selecting apparatus 10 may estimate the position 1002 where the wakeup word is spoken by using the information 3101, 3201, 3301, and 3401 related to the direction from which each voice recognition device 31, 32, 33, and 34 receives the wakeup word and information related to the location of each voice recognition device 31, 32, 33, and 34.

Subsequently, the processor 170 may select the first voice recognition device 31 which is closest to the position 1002 where the wakeup word is spoken as a voice-enabled device from among the voice recognition devices 31, 32, 33, and 34. The processor 170 may ask the first voice recognition device 31 selected as a voice-enabled device to output an activation response.

Upon receiving an activation response request, the first voice recognition device 31 may output an activation response ("ding").

FIG. 17 is a flowchart showing a procedure A which is performed when a threshold situation is detected in the step S735 of FIG. 15.

As shown in FIG. 17, if the current wakeup word recognition situation is determined to be a threshold situation in the step S735 of FIG. 15, the processor 170 of the voice-enabled device selecting apparatus 10 may select a voice-enabled device through the process A (the steps S737, S738, and S739) of FIG. 17.

First of all, if the current wakeup word recognition situation is determined to be a threshold situation, the processor 170 may receive, from a plurality of voice recognition devices 31, 32, 33, and 34, a plurality of voice signals the voice recognition device 31, 32, 33, and 34 have obtained by recognizing the wakeup word (S737).

For example, if the current wakeup word recognition situation is determined to be a threshold situation, the processor 170 may ask the voice recognition devices 31, 32, 33, and 34 for a plurality of voice signals the voice recognition devices 31, 32, 33, and 34 have obtained by recognizing the wakeup word.

Subsequently, upon receiving, from the voice recognition devices 31, 32, 33, and 34, a plurality of voice signals they have obtained by recognizing the wakeup word, the processor 170 may detect the direction in which the wakeup word is spoken based on the plurality of voice signals (S738).

The direction in which the wakeup word is spoken (the direction in which the user speaks the wakeup word) may refer to the direction the user is looking when speaking the wakeup word. That is, the processor 170 may analyze the plurality of voice signals received from the voice recognition devices 31, 32, 33, and 34, and detect the direction the user is looking when speaking the wakeup word based on the analysis results.

Lastly, after detecting the direction in which the wakeup word is spoken, the processor 170 may select a voice-enabled device from among the voice recognition devices 31, 32, 33, and 34 based on the direction in which the wakeup word is spoken and the position where the wakeup word is spoken (S739).

For example, the processor 170 may select at least one voice recognition device positioned in the direction in which the wakeup word is spoken based on the position where the wakeup word is spoken, and select the voice recognition device closest to the position where the wakeup word is spoken as a voice-enabled device from among the at least one voice recognition device.

FIG. 18 shows an example in which a voice-enabled device is selected using the method of FIG. 17.

As shown in FIG. 18, the voice-enabled device selecting apparatus 10 (or processor 170) may obtain first wakeup word reception direction information 3101 from the first voice recognition device 31, regarding the direction from which the first voice recognition device 31 receives the wakeup word 1001 ("Hi LG"), and obtain second wakeup word reception direction information 3201 from the second voice recognition device 32, regarding the direction from which the second voice recognition device 32 receives the wakeup word 1001.

Subsequently, the voice-enabled device selecting apparatus 10 may determine the position 1002 where the wakeup word is spoken, by using the first wakeup word reception direction information 3101 and the second wakeup word reception direction information 3201.

Here, the voice-enabled device selecting apparatus 10 may determine whether the situation in which the wakeup word is recognized is a threshold situation by using the time at which the first voice recognition device 31 and second voice recognition device 32 recognize the wakeup word 1001, information related to the user who is recognized as having spoken the wakeup word 1001, the first location of the first voice recognition device 31, the second location of the second voice recognition device 32, and the position 1002 where the wakeup word is spoken.

If the situation in which the wakeup word is recognized is determined to be a threshold situation, the voice-enabled device selecting apparatus 10 may obtain a first voice signal, obtained by the first voice recognition device 31 by recognizing the wakeup word 1001, from the first voice recognition device 31, and obtain a second voice signal, obtained by the second voice recognition device 32 by recognizing the wakeup word 1001, from the second voice recognition device 32. The voice-enabled device selecting apparatus 10 may analyze the first voice signal and the second voice signal, and detect the direction 1003 in which the wakeup word is spoken (the direction the user is looking when speaking the wakeup word) based on the analysis results.

Upon detecting the direction in which the wakeup word is spoken, the voice-enabled device selecting apparatus 10 may select the first voice recognition device 31 which is closest to the position 1002 where the wakeup word is spoken as a voice-enabled device from among the voice recognition devices positioned in the direction 1003 in which the wakeup word is spoken. The voice-enabled device selecting apparatus 10 may transmit an activation response request to the first voice recognition device 31 which is selected as a voice-enabled device.

The first voice recognition device 31 which is selected as a voice-enabled device may output an activation response ("ding") in accordance with the activation response request transmitted from the voice-enabled device selecting apparatus 10.

FIG. 19 is a flowchart showing a method for detecting a threshold situation using a 5G network.

As shown in FIG. 19, the processor 170 may control the communication unit 220 to transmit, to an AI processor included in a 5G network, feature values of wakeup word recognition situation information (the time at which the wakeup word is recognized, the user who is recognized as having spoken the wakeup word, the location of each voice recognition device, and the position where the wakeup word is spoken). Moreover, the processor 170 may control the communication unit 220 to receive AI-processed information from the AI processor.

The AI-processed information may include the probability of a threshold situation in which voice signals, as well as the position where the wakeup word is spoken, need to be reflected in selecting a voice-enabled device.

Meanwhile, the voice-enabled device selecting apparatus 10 may perform an initial access procedure with the 5G network, in order to transmit the wakeup word recognition situation information to the 5G network. The voice-enabled device selecting apparatus 10 may perform an initial access procedure with the 5G network based on a synchronization signal block (SSB).

Moreover, the voice-enabled device selecting apparatus 10 may receive, from the network through a wireless communication unit, downlink control information (DCI) which is used to schedule the transmission of the wakeup word recognition situation information.

The processor 170 may transmit the wakeup word recognition situation information to the network based on the DCI.

The wakeup word recognition situation information may be transmitted to the network via a PUSCH, and the SSB and the DM-RS of the PUSCH may be quasi co-located with QCL type D.

Referring to FIG. 19, the voice-enabled device selecting apparatus 10 may transmit feature values taken from the wakeup word recognition situation information to a 5G network (S1900).

Here, the 5G network may include an AI processor or AI system, and the AI system of the 5G network may perform AI processing based on received sensing information (S1910).

The AI system may input the feature values received from the voice-enabled device selecting apparatus 10 into an ANN classifier (S1911). The AI system may analyze an ANN output value (S1913), and obtain the probability that the current wakeup word recognition situation is a threshold situation based on the ANN output value (S1915). The 5G network may transmit the probability of a threshold situation determined by the AI system to the voice-enabled device selecting apparatus 10 through a wireless communication unit.

Upon determining that the current wakeup word recognition situation is a threshold situation (S1917), the AI system may confirm that the current wakeup word recognition situation is a threshold situation in which voice signals, as well as the position where the wakeup word is spoken, need to be reflected (S1919), and may transmit, to the voice-enabled device selecting apparatus 10, an instruction for selecting a voice-enabled device by reflecting the voice signals as well (S1930).

Moreover, upon determining that the current wakeup word recognition situation is not a threshold situation, or after obtaining the probability of a threshold situation, the AI system may transmit the probability of a threshold situation to the voice-enabled device selecting apparatus 10 (S1920), and the voice-enabled device selecting apparatus 10 may determine whether the current wakeup word recognition situation is a threshold situation by analyzing the probability of a threshold situation.

Meanwhile, the voice-enabled device selecting apparatus 10 may transmit only wakeup word recognition situation information to a 5G network, and may take feature values from the wakeup word recognition situation information, which may be used as inputs to the artificial neural network to detect a threshold situation.

Advantageous effects of the method and apparatus for selecting a voice-enabled device according to the present invention will be described below.

One advantage of the present invention is to reduce the amount of communication load between a home IoT server and home IoT devices and minimize the amount of computation of the home IoT server by only using information related to the direction from which a wakeup word is received, rather than an entire voice signal, which is relatively large in data volume.

Another advantage of the present invention is to find the position where the wakeup word is spoken more accurately, by using the angle at which each IoT device receives the wakeup word, rather than voice signal characteristics, even when it is difficult to compare the characteristics of voice signals obtained by different IoT devices because the differences in characteristics between the voice signals are minor, thereby allowing for more accurately selecting the IoT device closest to the position where the wakeup word is spoken.

Another advantage of the present invention is to accurately select the closest IoT device by using the angle at which the wakeup word is spoken, even if the results of analysis of the characteristics of voice signals do not accurately reflect the distance between each IoT device and the position where the wakeup word is spoken because each IoT device's microphone is in a different configuration state.

Another advantage of the present invention is to accurately select the closest IoT device by using the angle at which the wakeup word is received, if the results of analysis of signal characteristics hardly reflect information related to the relative location of each IoT device due to differences between each IoT device in their sensitivity to the wakeup word or in their algorithm.

Another advantage of the present invention is to accurately select the closest IoT device positioned in the direction in which the user speaks the wakeup word, rather than an IoT device closer to the position where the wakeup word is spoken but located in the opposite direction to the direction in which the user speaks the wakeup word, by using information related to the direction in which the wakeup word is spoken, as well as information related to the direction from which each IoT device receives the wakeup word.

What is claimed is:

1. A method for selecting a voice-enabled device, the method comprising:
   obtaining information related to a wakeup word from a plurality of voice recognition devices; and
   selecting the voice-enabled device from among the plurality of voice-recognition devices based on the information related to the wakeup word,
   wherein the obtaining of the information related to the wakeup word comprises obtaining information related to a direction from which each voice recognition device receives the wakeup word from the plurality of voice recognition devices,
   wherein the selecting of the voice-enabled device comprises:
      determining a position where the wakeup word is spoken based on the information related to the direction from which each voice recognition device receives the wakeup word; and
      selecting a voice recognition device related to the position where the wakeup word is spoken,
   wherein the selecting of the voice-enabled device comprises selecting the voice recognition device closest to the position where the wakeup word is spoken from among the plurality of voice recognition devices, and
   wherein the information related to the direction from which the wakeup word is received comprises:
      information related to a vertical angle at which each voice recognition device receives the wakeup word; and
      information related to a horizontal angle at which each voice recognition device receives the wakeup word.

2. The method of claim 1, wherein the determining of the position where the wakeup word is spoken comprises:
   obtaining information related to a location of each voice recognition device; and
   estimating the position where the wakeup word is spoken by using the information related to the location of each voice recognition device and the information related to the direction from which the wakeup word is received.

3. The method of claim 1, further comprising:
   obtaining information related to a situation in which the wakeup word is recognized by each voice recognition device; and
   applying the information related to the situation in which the wakeup word is recognized to a pre-learned threshold situation detection and classification model,
   wherein the selecting of the voice-enabled device comprises:
      determining whether the situation in which the wakeup word is recognized is a threshold situation based on a result of the applying; and
      selecting the voice-enabled device using both the information related to the direction from which the wakeup word is received and a plurality of voice signals each voice recognition device obtains by recognizing the wakeup word.

4. The method of claim 3, further comprising, if the situation in which the wakeup word is recognized is determined to be a threshold situation, obtaining the plurality of voice signals from the plurality of voice recognition devices,
   wherein the selecting of the voice recognition device comprises:
      determining a direction in which the wakeup word is spoken based on the plurality of voice signals; and
      selecting the voice recognition device related to the position where the wakeup word is spoken.

5. The method of claim 4, wherein the selecting of the voice recognition device comprises selecting the voice recognition device closest to the positon where the wakeup word is spoken from among at least one voice recognition device positioned in the direction in which the wakeup word is spoken.

6. The method of claim 3, wherein information related to a situation in which the wakeup word is spoken comprises:
   information related to time at which the wakeup word is recognized;
   information related to a user who is recognized as having spoken the wakeup word;
   information related to a location of each voice recognition device; and
   information related to the position where the wakeup word is spoken.

7. The method of claim 3, wherein the pre-learned threshold situation detection and classification model is stored in an external artificial intelligence (AI) device, and
   wherein the applying of the information related to the situation in which the wakeup word is recognized to the pre-learned threshold situation detection and classification model comprises:
      transmitting feature values related to information related to a situation in which the wakeup word is spoken to the AI device; and
      obtaining, from the AI device, the result of the applying the information related to the situation in which the wakeup word is recognized to the pre-learned threshold situation detection and classification model.

8. The method of claim 3, wherein the pre-learned threshold situation detection and classification model is stored in a network, and
   wherein the applying of the information related to the situation in which the wakeup word is recognized to the pre-learned threshold situation detection and classification model comprises:
      transmitting information related to a situation in which the wakeup word is spoken to the network; and obtaining, from the network, the result of the applying the information related to the situation in which the wakeup word is recognized to the pre-learned threshold situation detection and classification model.

9. The method of claim 8, further comprising receiving, from the network, downlink control information (DCI) which is used to schedule the transmission of the information related to the situation in which the wakeup word is spoken,
wherein the information related to the situation in which the wakeup word is spoken is transmitted to the network based on the DCI.

10. The method of claim 9, further comprising performing an initial access procedure with the network based on a synchronization signal block (SSB),
wherein the information related to the situation in which the wakeup word is spoken is transmitted to the network via a physical uplink shared channel (PUSCH), and the SSB and a demodulation reference signal (DM-RS) of the PUSCH are quasi co-located with a quasi co location (QCL) type D.

11. The method of claim 9, further comprising:
controlling a communication module to transmit the information related to the situation in which the wakeup word is spoken to an artificial intelligence (AI) processor included in the network; and
controlling the communication module to receive AI-processed information from the AI processor,
wherein the AI-processed information is information related to threshold situation probability for determining whether the situation in which the wakeup word is spoken is the threshold situation.

12. An apparatus for selecting a voice-enabled device, the apparatus comprising:
a communication module configured to obtain information related to a wakeup word from a plurality of voice recognition devices; and
a processor configured to select the voice-enabled device from among the plurality of voice-recognition devices based on the information related to the wakeup word,
wherein the processor obtains information related to a direction from which each voice recognition device receives the wakeup word from the plurality of voice recognition devices through the communication module, determines a position where the wakeup word is spoken based on the information related to the direction from which each voice recognition device receives the wakeup word, and selects a voice recognition device related to the position where the wakeup word is spoken,
wherein the processor selects the voice recognition device closest to the position where the wakeup word is spoken from among the plurality of voice recognition devices, and
wherein the information related to the direction from which the wakeup word is received comprises:
information related to a vertical angle at which each voice recognition device receives the wakeup word; and
information related to a horizontal angle at which each voice recognition device receives the wakeup word.

13. The apparatus of claim 12, wherein the processor obtains information related to a location of each voice recognition device through the communication module and estimates the position where the wakeup word is spoken by using the information related to the location of each voice recognition device and the information related to the direction from which the wakeup word is received.

14. The apparatus of claim 12, wherein the processor:
obtains information related to a situation in which each voice recognition device recognizes the wakeup word through the communication module,
applies the information related to the situation in which the wakeup word is recognized to a pre-learned threshold situation detection and classification model,
determines whether the situation in which the wakeup word is recognized is a threshold situation based on a result of the applying, and
selects the voice-enabled device using both the information related to the direction from which the wakeup word is received and a plurality of voice signals each voice recognition device obtains by recognizing the wakeup word.

15. The apparatus of claim 12, wherein, if a situation in which the wakeup word is recognized is determined to be a threshold situation, the processor:
obtains a plurality of voice signals from the plurality of voice recognition devices through the communication module,
determines a direction in which the wakeup word is spoken based on the plurality of voice signals, and
selects the voice recognition device related to the position where the wakeup word is spoken.

16. The apparatus of claim 12, wherein the processor selects the voice recognition device closest to the position where the wakeup word is spoken from among at least one voice recognition device positioned in a direction in which the wakeup word is spoken.

17. The apparatus of claim 14, wherein information related to a situation in which the wakeup word is spoken comprises:
information related to time at which the wakeup word is recognized;
information related to a user who is recognized as having spoken the wakeup word;
information related to a location of each voice recognition device; and
information related to the position where the wakeup word is spoken.

18. The apparatus of claim 14, wherein the pre-learned threshold situation detection and classification model is stored in an external artificial intelligence (AI) device, and
the processor transmits feature values related to information related to a situation in which the wakeup word is spoken to the AI device, and obtains, from the AI device, the result of the applying the information related to the situation in which the wakeup word is recognized to the pre-learned threshold situation detection and classification model.

19. The apparatus of claim 14, wherein the pre-learned threshold situation detection and classification model is stored in a network, and
the processor transmits information related to a situation in which the wakeup word is spoken to the network, and obtains, from the network, the result of the applying the information related to the situation in which the wakeup word is recognized to the pre-learned threshold situation detection and classification model.

* * * * *